US011463744B2

(12) United States Patent
Grover

(10) Patent No.: US 11,463,744 B2
(45) Date of Patent: Oct. 4, 2022

(54) USE OF PRIMARY AND BACKUP INSTANCES OF SUPPLEMENTAL CONTENT TO FACILITATE DYNAMIC CONTENT MODIFICATION

(71) Applicant: Roku, Inc., San Jose, CA (US)

(72) Inventor: Matthew Grover, Cardiff (GB)

(73) Assignee: ROKU, INC., San Jose, CA (US)

( * ) Notice: Subject to any disclaimer, the term of this patent is extended or adjusted under 35 U.S.C. 154(b) by 0 days.

(21) Appl. No.: 17/446,870

(22) Filed: Sep. 3, 2021

(65) Prior Publication Data

US 2022/0141504 A1    May 5, 2022

Related U.S. Application Data

(60) Provisional application No. 63/198,594, filed on Oct. 29, 2020.

(51) Int. Cl.
*H04N 21/234* (2011.01)
*H04N 21/262* (2011.01)

(52) U.S. Cl.
CPC . *H04N 21/23424* (2013.01); *H04N 21/26241* (2013.01); *H04N 21/26283* (2013.01)

(58) Field of Classification Search
CPC .............................................. H04N 21/23424
See application file for complete search history.

(56) References Cited

U.S. PATENT DOCUMENTS

| 9,510,044 B1* | 11/2016 | Pereira | H04N 21/44204 |
| 2021/0076095 A1* | 3/2021 | Winograd | H04N 21/44016 |
| 2021/0084091 A1* | 3/2021 | Cormie | H04L 69/14 |

* cited by examiner

*Primary Examiner* — Michael H Hong
(74) *Attorney, Agent, or Firm* — Sterne, Kessler, Goldstein & Fox P.L.L.C.

(57) ABSTRACT

A method and system to help facilitate dynamic content modification. When a modifiable content segment is scheduled to be present at an upcoming time on a channel that is being received by a content-presentation device, a system will provision the content-presentation device with multiple supplemental content segments each being a respective candidate segment applicable by the content-presentation device in dynamic content modification of the channel at the upcoming time. Then before the upcoming time, one of the provisioned supplemental content segments will be selected for application by the content-presentation device in the dynamic content modification at the upcoming time, with the selecting being based on whether the modifiable content segment will actually be present on the channel at the upcoming time. This arrangement can thereby help facilitate dynamic content modification even if the scheduled modifiable content segment does not end up being present at the time scheduled.

20 Claims, 10 Drawing Sheets

| Time Period | Content-Distribution System 102 | Content-Presentation Device 104 | Fingerprint-Matching Server 106 | Content-Management System 108 | Data-Management System 110 | Supplemental-Content Delivery System 112 |
|---|---|---|---|---|---|---|
| T1 | Transmit first content on a channel | | | | | |
| T2 | Generate first fingerprint data and first metadata | | | | | |
| T3 | Transmit first fingerprint data and first metadata | | | | | |
| T4 | | Receive second content | | | | |
| T5 | | Generate second fingerprint data and second metadata | | | | |
| T6 | | Transmit second fingerprint data and second metadata | | | | |
| T7 | | | Receive first fingerprint data and first metadata | | | |
| T8 | | | Receive second fingerprint data and second metadata | | | |

Figure 4A

| | | | |
|---|---|---|---|
| T9 | | Compare first fingerprint data and second fingerprint data | |
| T10 | | Detect a match between first fingerprint data and second fingerprint data | |
| T11 | | Identify the channel on which the second content is being received | |
| T12 | | Generate metadata associated with the identified channel | |
| T13 | | Transmit an indication of the identified channel and the associated metadata | |
| T14 | | | Receive the indication of the identified channel and the associated metadata |

Figure 4B

|  |  |  | Determine historical content consumption data |  |
|---|---|---|---|---|
| T15 |  |  |  |  |
| T16 | Transmit third content |  |  |  |
| T17 |  | Generate third fingerprint data and third metadata |  |  |
| T18 |  | Transmit third fingerprint data and third metadata |  |  |
| T19 |  |  | Receive modifiable content segment |  |
| T20 |  |  | Generate fourth fingerprint data and fourth metadata |  |
| T21 |  |  | Transmit fourth fingerprint data and fourth metadata |  |
| T22 |  | Receive third fingerprint data and third metadata |  |  |
| T23 |  | Receive fourth fingerprint data and fourth metadata |  |  |

Figure 4C

| | | | | | |
|---|---|---|---|---|---|
| T24 | | Compare at least a portion of third fingerprint data and at least a portion of fourth fingerprint data | | | |
| T25 | | Detect a match between at least a portion of third fingerprint data and at least a portion of fourth fingerprint data | | | |
| T26 | | Identify an upcoming content modification opportunity on the identified channel | | | |
| T27 | | Transmit the third fingerprint data and the third metadata | | | |
| T28 | Receive third fingerprint data and third metadata | | | | |
| T29 | Receive fifth content | | | | |
| T30 | Output for presentation fifth content | | | | |

Figure 4D

| | | | | | |
|---|---|---|---|---|---|
| T31 | Generate fifth fingerprint data and fifth metadata | | | | |
| T32 | Compare the third fingerprint data and the fifth fingerprint data | | | | |
| T33 | Detect a match between the third fingerprint data and the fifth fingerprint data | | | | |
| T34 | Determine modification start time and modification end time | | | | |
| T35 | Transmit a request for supplemental content | | | | |
| T36 | | | | Receive request and select supplemental content | |
| T37 | | | | Transmit request for link | |
| T38 | | | | | Transmit link |

Figure 4E

| T39 | | Transmit link | |
|---|---|---|---|
| T40 | Receive link and retrieve supplemental content | | |
| T41 | Perform content modification operation | | |

Figure 4F

USE OF PRIMARY AND BACKUP INSTANCES OF SUPPLEMENTAL CONTENT TO FACILITATE DYNAMIC CONTENT MODIFICATION

REFERENCE TO RELATED APPLICATION

This application claims priority to U.S. Provisional Patent Application No. 63/198,594, filed Oct. 29, 2020, the entirety of which is hereby incorporated by reference.

USAGE AND TERMINOLOGY

In this disclosure, unless otherwise specified and/or unless the particular context clearly dictates otherwise, the terms "a" or "an" mean at least one, and the term "the" means the at least one.

SUMMARY

In one aspect, a method includes, when a modifiable content segment is scheduled to be present at an upcoming time on a channel that is being received by a content-presentation device, a computing system provisioning the content-presentation device with multiple supplemental content segments including at least a primary supplemental content segment and a backup supplemental content segment, each supplemental content segment being a respective candidate segment applicable by the content-presentation device in dynamic content modification of the channel at the upcoming time. And the method includes, after the provisioning and before the upcoming time, selecting one of the provisioned supplemental content segments for application by the content-presentation device in the dynamic content modification at the upcoming time, the selecting being based on whether the modifiable content segment will actually be present on the channel at the upcoming time.

In another aspect, at least one non-transitory computer-readable storage medium has stored thereon program instructions that, upon execution by at least one processor, cause performance of a set of operations. The set of operations includes, when a modifiable content segment is scheduled to be present at an upcoming time on a channel that is being received by a content-presentation device, a computing system provisioning the content-presentation device with multiple supplemental content segments including at least a primary supplemental content segment and a backup supplemental content segment, each supplemental content segment being a respective candidate segment applicable by the content-presentation device in dynamic content modification of the channel at the upcoming time. And the set of operations includes, after the provisioning and before the upcoming time, selecting one of the provisioned supplemental content segments for application by the content-presentation device in the dynamic content modification at the upcoming time, the selecting being based on whether the modifiable content segment will actually be present on the channel at the upcoming time.

And in another aspect, a computing system includes at least one processor and at least one non-transitory computer-readable storage medium, having stored thereon program instructions that, upon execution by the at least one processor, cause performance of a set of operations. The set of operations includes likewise includes, when a modifiable content segment is scheduled to be present at an upcoming time on a channel that is being received by a content-presentation device, a computing system provisioning the content-presentation device with multiple supplemental content segments including at least a primary supplemental content segment and a backup supplemental content segment, each supplemental content segment being a respective candidate segment applicable by the content-presentation device in dynamic content modification of the channel at the upcoming time. And the set of operations includes, after the provisioning and before the upcoming time, selecting one of the provisioned supplemental content segments for application by the content-presentation device in the dynamic content modification at the upcoming time, the selecting being based on whether the modifiable content segment will actually be present on the channel at the upcoming time.

BRIEF DESCRIPTION OF THE DRAWINGS

FIGS. 4A, 4B, 4C, 4D, 4E, and 4F collectively make up a table showing example time-periods and corresponding operations that can be performed in connection with the example content-modification system.

DETAILED DESCRIPTION

I. Overview

Figure 1:
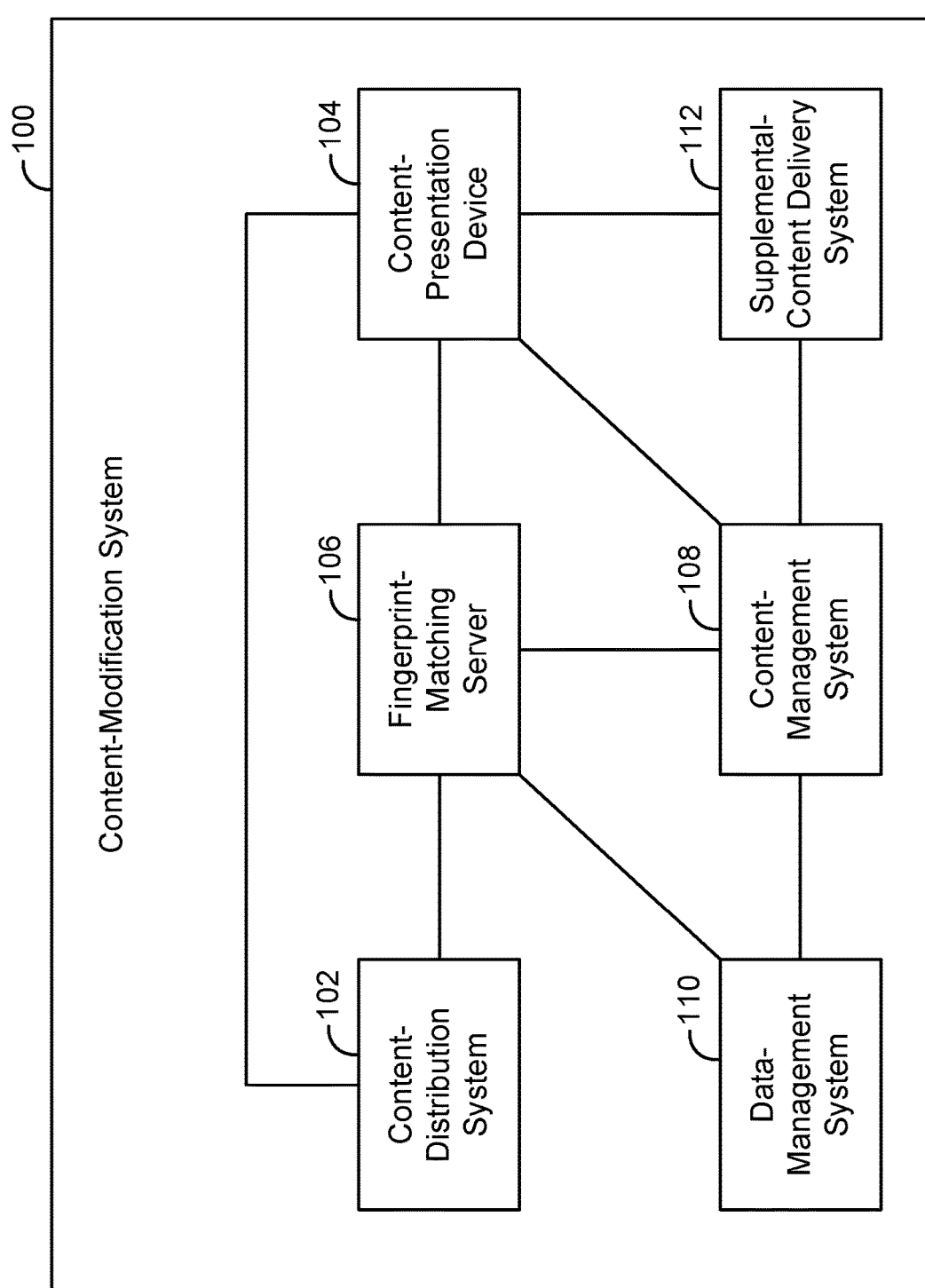
FIG. 1 is a simplified block diagram of an example content-modification system in which various described principles can be implemented.

To deliver and present content to end-users, a content provider can transmit the content to one or more content-distribution systems, each of which can in turn transmit the content to one or more respective content-presentation devices to be output for presentation to respective end-users. Such a hierarchical arrangement can facilitate convenient, widespread distribution of content.

By way of example, in order for a video content provider to deliver video content to end-users throughout the United States, the video content provider can transmit the video content by satellite or another medium to content-distribution systems that serve respective designated market areas (DMAs) within the United States. Each such content-distribution system can therefore receive the national satellite feed carrying the video content and can transmit the video content to television sets and/or set-top boxes in the content-distribution system's DMA, such that the video content can be output for presentation to respective end-users in that DMA. In practice, these content-distribution systems and their means of transmission to content-presentation devices can take various forms. For instance, a content-distribution system can be associated with a cable-television provider and can transmit video content to content-presentation devices of end-users who are cable-television subscribers through hybrid fiber/coaxial cable connections.

As such, in various scenarios, a content-distribution system can transmit content to a content-presentation device, which can receive and output the content for presentation to an end-user. In some situations, even though the content-presentation device receives content from the content-distribution system, it can be desirable for the content-presentation device to perform a content modification operation so that the content-presentation device can output for presentation alternative content instead of at least a portion of that received content.

For example, in the case where the content-presentation device receives a linear sequence of content segments that includes a given advertisement ("ad") segment positioned somewhere within the sequence, it can be desirable for the content-presentation device to replace the given ad segment with a different ad segment that is perhaps more targeted to the end-user (e.g., more targeted to the end-user's interests, demographics, etc.). As another example, it can be desirable for the content-presentation device to overlay on the given ad segment, overlay content that enhances the given ad segment in a way that is again perhaps more targeted to the end-user. The described content-modification system can facilitate providing these and other related features.

In one example, the content-modification system can include a fingerprint-matching server that can identify an upcoming content modification opportunity on an identified channel, which it can do by comparing and detecting a match between two different instances of fingerprint data. Based on the detected match, the fingerprint-matching server can then transmit fingerprint data and metadata to the content-presentation device data to facilitate preparing the content-presentation device to perform a content modification operation in connection with the identified upcoming content modification opportunity.

Further, in other cases, it may be desirable for the content-presentation device to use one or more alternative techniques to facilitate performing a content modification operation. For example, the fingerprint-matching server can use broadcast-schedule data to facilitate the content-presentation device performing a content modification operation. Among other things, this can allow the content-presentation device to facilitate performing a content modification operation without using fingerprint data or by using fingerprint data in a more limited fashion. This can be beneficial in the case where the content-presentation device does not receive or otherwise have access to fingerprint data, or where the use of fingerprint data is undesirable for one or more reasons (e.g., because fingerprint-based techniques may be computationally expensive).

II. Architecture

A. Content-Modification System

FIG. 1 is a simplified block diagram of an example content-modification system 100. The content-modification system 100 can include various components, such as a content-distribution system 102, a content-presentation device 104, a fingerprint-matching server 106, a content-management system 108, a data-management system 110, and/or a supplemental-content delivery system 112.

The content-modification system 100 can also include one or more connection mechanisms that connect various components within the content-modification system 100. For example, the content-modification system 100 can include the connection mechanisms represented by lines connecting components of the content-modification system 100, as shown in FIG. 1.

In this disclosure, the term "connection mechanism" means a mechanism that connects and facilitates communication between two or more components, devices, systems, or other entities. A connection mechanism can be or include a relatively simple mechanism, such as a cable or system bus, and/or a relatively complex mechanism, such as a packet-based communication network (e.g., the Internet). In some instances, a connection mechanism can be or include a non-tangible medium, such as in the case where the connection is at least partially wireless. In this disclosure, a connection can be a direct connection or an indirect connection, the latter being a connection that passes through and/or traverses one or more entities, such as a router, switcher, or other network device. Likewise, in this disclosure, communication (e.g., a transmission or receipt of data) can be a direct or indirect communication.

The content-modification system 100 and/or components thereof can take the form of a computing system, an example of which is described below.

Notably, in practice, the content-modification system 100 is likely to include many instances of at least some of the described components. For example, the content-modification system 100 is likely to include many content-distribution systems and many content-presentation devices.

B. Computing System

Figure 2:
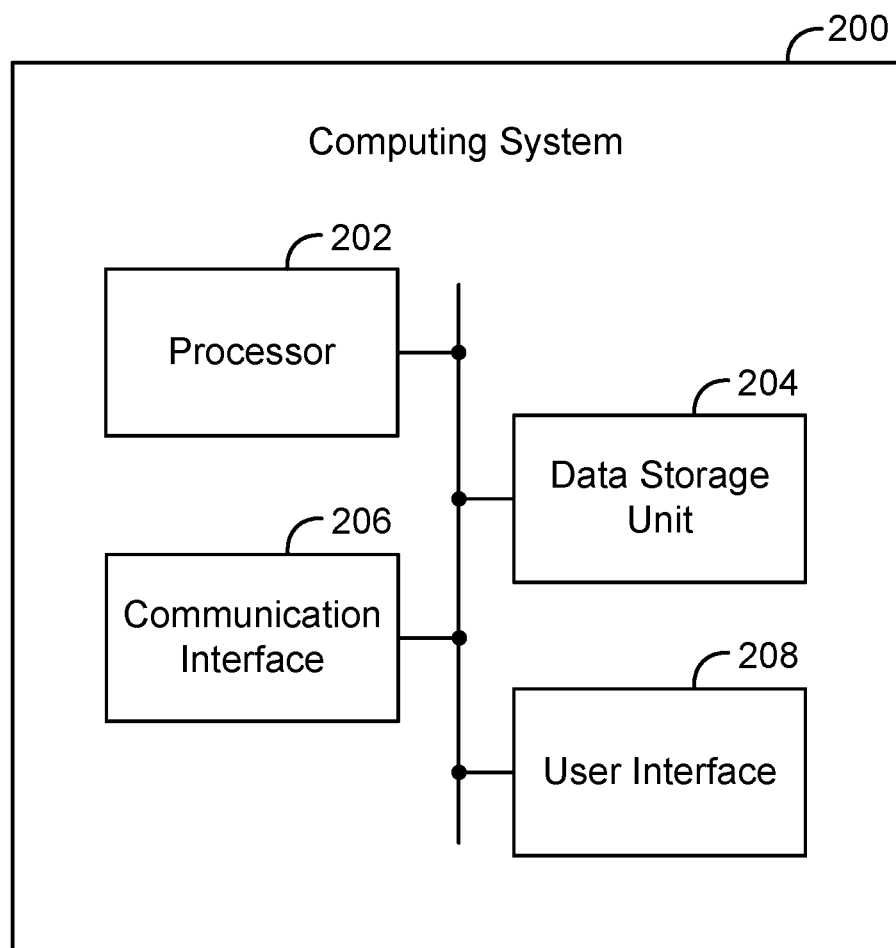
FIG. 2 is a simplified block diagram of an example computing system in which various described principles can be implemented.

FIG. 2 is a simplified block diagram of an example computing system 200. The computing system 200 can be configured to perform and/or can perform one or more operations, such as the operations described in this disclosure. The computing system 200 can include various components, such as a processor 202, a data-storage unit 204, a communication interface 206, and/or a user interface 208.

The processor 202 can be or include one or more general-purpose processors (e.g., microprocessors) and/or one or more special-purpose processors (e.g., digital signal processors). The processor 202 can execute program instructions included in the data-storage unit 204 as described below.

The data-storage unit 204 can be or include one or more volatile, non-volatile, removable, and/or non-removable storage components, such as magnetic, optical, and/or flash storage, and/or can be integrated in whole or in part with the processor 202. Further, the data-storage unit 204 can be or include a non-transitory computer-readable storage medium, having stored thereon program instructions (e.g., compiled or non-compiled program logic and/or machine code) that, upon execution by the processor 202, cause the computing system 200 and/or another computing system to perform one or more operations, such as the operations described in this disclosure. These program instructions can define, and/or be part of, a discrete software application.

In some instances, the computing system 200 can execute program instructions in response to receiving an input, such as an input received via the communication interface 206 and/or the user interface 208. The data-storage unit 204 can also store other data, such as any of the data described in this disclosure.

The communication interface 206 can allow the computing system 200 to connect with and/or communicate with another entity according to one or more protocols. Therefore, the computing system 200 can transmit data to, and/or receive data from, one or more other entities according to one or more protocols. In one example, the communication interface 206 can be or include a wired interface, such as an Ethernet interface or a High-Definition Multimedia Interface (HDMI). In another example, the communication interface 206 can be or include a wireless interface, such as a cellular or WI-FI interface.

The user interface 208 can allow for interaction between the computing system 200 and a user of the computing system 200. As such, the user interface 208 can be or include an input component such as a keyboard, a mouse, a remote controller, a microphone, and/or a touch-sensitive panel. The user interface 208 can also be or include an output component such as a display device (which, for example, can be combined with a touch-sensitive panel) and/or a sound speaker.

The computing system 200 can also include one or more connection mechanisms that connect various components within the computing system 200. For example, the computing system 200 can include the connection mechanisms represented by lines that connect components of the computing system 200, as shown in FIG. 2.

The computing system 200 can include one or more of the above-described components and can be configured or arranged in various ways. For example, the computing system 200 can be configured as a server and/or a client (or perhaps a cluster of servers and/or a cluster of clients) operating in one or more server-client type arrangements, for instance.

As noted above, the content-modification system 100 and/or components thereof can take the form of a computing system, such as the computing system 200. In some cases, some or all these entities can take the form of a more specific type of computing system. For instance, in the case of the content-presentation device 104, it can take the form of a desktop computer, a laptop, a tablet, a mobile phone, a television set, a set-top box, a streaming media receiver, a television set with an integrated set-top box or streaming media receiver, a media dongle, or a television set with a media dongle, streaming media receiver, or other device connected to it, among other possibilities.

III. Example Operations

The content-modification system 100 and/or components thereof can be configured to perform and/or can perform one or more operations. Examples of these operations and related features will now be described.

As noted above, in practice, the content-modification system 100 is likely to include many instances of at least some of the described components. Likewise, in practice, it is likely that at least some of described operations will be performed many times (perhaps on a routine basis and/or in connection with additional instances of the described components).

A. Operations Related to the Content-Distribution System Transmitting Content and the Content-Presentation Device Receiving and Outputting Content For context, general operations and examples related to the content-distribution system 102 transmitting content and the content-presentation device 104 receiving and outputting content will now be described.

To begin, the content-distribution system 102 can transmit content (e.g., content that it received from a content provider) to one or more entities such as the content-presentation device 104. Content can be or include audio content and/or video content, for example. In some examples, content can take the form of a linear sequence of content segments (e.g., program segments and ad segments) or a portion thereof. In the case of video content, a portion of the video content may be one or more frames, for example.

The content-distribution system 102 can transmit content on one or more channels (sometimes referred to as stations or feeds). As such, the content-distribution system 102 can be associated with a single channel content distributor or a multi-channel content distributor such as a multi-channel video program distributor (MVPD).

The content-distribution system 102 and its means of transmission of content on the channel to the content-presentation device 104 can take various forms. By way of example, the content-distribution system 102 can be or include a cable-television head-end that is associated with a cable-television provider and that transmits the content on the channel to the content-presentation device 104 through hybrid fiber/coaxial cable connections. As another example, the content-distribution system 102 can be or include a satellite-television head-end that is associated with a satellite-television provider and that transmits the content on the channel to the content-presentation device 104 through a satellite transmission. As yet another example, the content-distribution system 102 can be or include a television-broadcast station that is associated with a television-broadcast provider and that transmits the content on the channel through a terrestrial over-the-air interface to the content-presentation device 104. In these and other examples, the content-distribution system 102 can transmit the content in the form of an analog or digital broadcast stream representing the content.

The content-presentation device 104 can receive content from one or more entities, such as the content-distribution system 102. In one example, the content-presentation device 104 can select (e.g., by tuning to) a channel from among multiple available channels, perhaps based on input received via a user interface, such that the content-presentation device 104 can receive content on the selected channel.

The content-presentation device 104 can also output content for presentation. As noted above, the content-presentation device 104 can take various forms. In one example, in the case where the content-presentation device 104 is a television set (perhaps with an integrated set-top box and/or media dongle), outputting the content for presentation can involve the television set outputting the content via a user interface (e.g., a display device and/or a sound speaker), such that it can be presented to an end-user. As another example, in the case where the content-presentation device 104 is a set-top box or a media dongle, outputting the content for presentation can involve the set-top box or the media dongle outputting the content via a communication interface (e.g., an HDMI interface), such that it can be received by a television set and in turn output by the television set for presentation to an end-user.

As such, in various scenarios, the content-distribution system 102 can transmit content to the content-presentation device 104, which can receive and output the content for presentation to an end-user. In some situations, even though the content-presentation device 104 receives content from the content-distribution system 102, it can be desirable for the content-presentation device 104 to perform a content modification operation so that the content-presentation device 104 can output for presentation alternative content instead of at least a portion of that received content.

For example, in the case where the content-presentation device 104 receives a linear sequence of content segments that includes a given ad segment positioned somewhere within the sequence, it can be desirable for the content-presentation device 104 to replace the given ad segment with a different ad segment that is perhaps more targeted to the end-user (i.e., more targeted to the end-user's interests, demographics, etc.). As another example, it can be desirable for the content-presentation device 104 to overlay on the given ad segment, overlay content that enhances the given ad segment in a way that is again perhaps more targeted to the end-user. The described content-modification system 100 can facilitate providing these and other related features.

As noted above, in one example, content can take the form of a linear sequence of content segments. As such, in one example, the content-distribution system 102 can transmit a linear sequence of content segments. This is referred to herein as a "transmission sequence." Likewise, the content-presentation device 104 can receive a linear sequence of content segments. This is referred to herein as a "receipt sequence."

Figure 3:
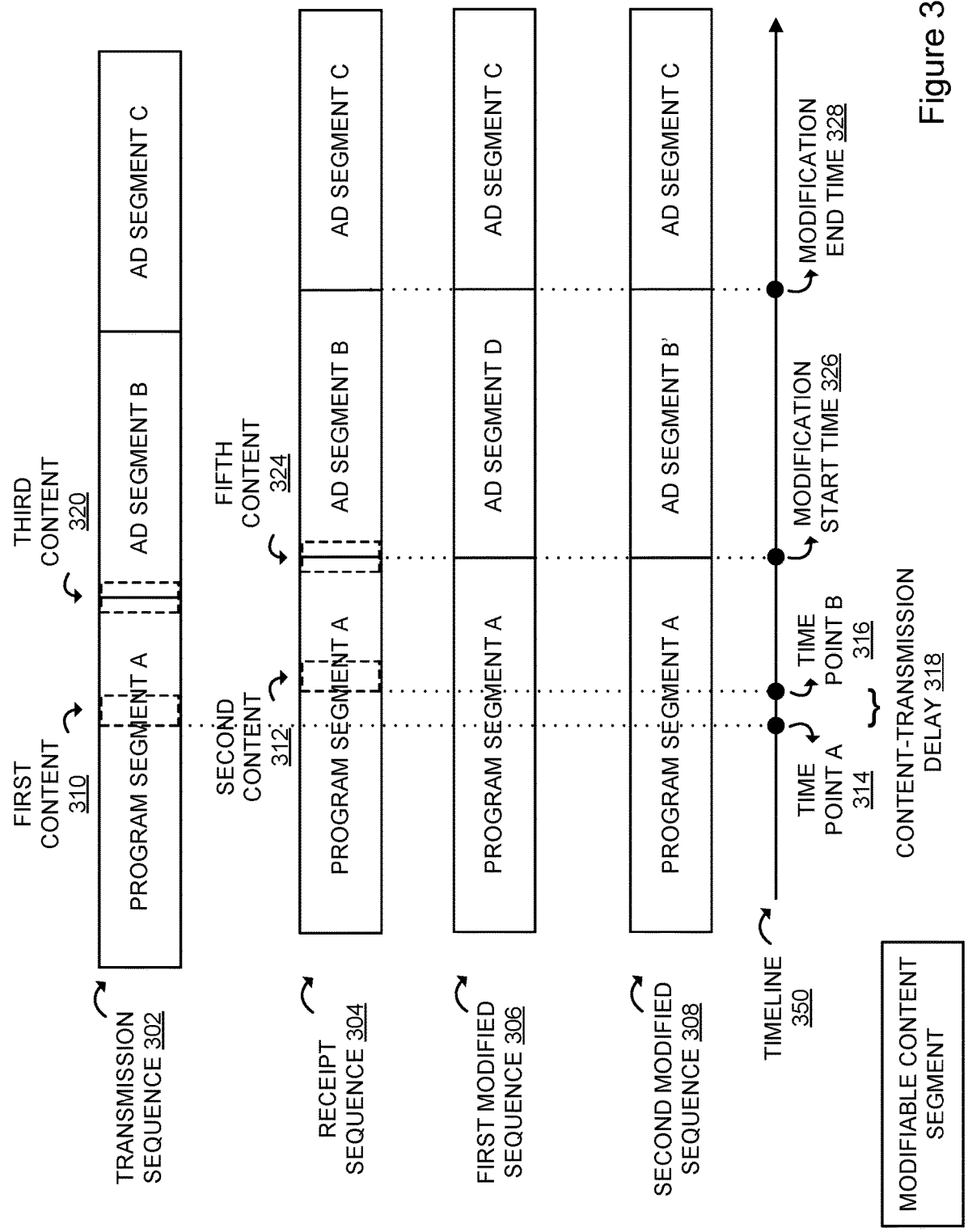
FIG. 3 is a diagram of example linear sequences of content and related concepts.

FIG. 3 illustrates some examples of these concepts. In one example, the transmission sequence is the TRANSMISSION SEQUENCE 302 shown in FIG. 3. As shown, the TRANSMISSION SEQUENCE 302 includes a PROGRAM SEGMENT A, followed by an AD SEGMENT B, followed by an AD SEGMENT C.

Likewise, in one example, the receipt sequence is the RECEIPT SEQUENCE 304 shown in FIG. 3. In this example, the content-distribution system 102 transmits the TRANSMISSION SEQUENCE 302 to the content-presentation device 104, which the content-presentation device 104 receives as the RECEIPT SEQUENCE 304, and therefore the TRANSMISSION SEQUENCE 302 and the RECEIPT SEQUENCE 304 are the same. As such, as shown, the RECEIPT SEQUENCE 304 also includes the PROGRAM SEGMENT A, followed by the AD SEGMENT B, followed by the AD SEGMENT C.

In FIG. 3, the transmission time of the TRANSMISSION SEQUENCE 302 and the receipt time of the RECEIPT SEQUENCE 304 are shown by way of their relationship to a TIMELINE 350. Notably, the transmission time and the receipt time are offset from each other due to a content-transmission delay, which is described in greater detail below.

B. Overview of Operations Related to the Dynamic Content Modification

As noted above, in some situations, even though the content-presentation device 104 receives content from the content-distribution system 102, it can be desirable for the content-presentation device 104 to perform a content modification operation so that the content-presentation device 104 can output for presentation alternative content instead of at least a portion of that received content. For example, in the case where the content-presentation device 104 receives the receipt sequence, rather than outputting for presentation the receipt sequence, the content-presentation device 104 can output for presentation a modified version of the receipt sequence instead. This is referred to herein as a "modified sequence."

For example, in the case where the receipt sequence includes a given ad segment positioned somewhere within the receipt sequence, it can be desirable for the content-presentation device 104 to replace the given ad segment with a different ad segment that is perhaps more targeted to the end-user (i.e., more targeted to the end-user's interests, demographics, etc.), thereby resulting in a modified sequence that the content-presentation device 104 can output for presentation.

To illustrate this, in one example, the modified sequence is the FIRST MODIFIED SEQUENCE 306 shown in FIG. 3. As shown, the FIRST MODIFIED SEQUENCE 306 includes the PROGRAM SEGMENT A, followed by the AD SEGMENT D (which replaced the AD SEGMENT B), followed by the AD SEGMENT C.

As another example, it can be desirable for the content-presentation device 104 to overlay on the given ad segment, overlay content that enhances the given ad segment in a way that is again perhaps more targeted to the end-user, thereby resulting in a modified sequence that the content-presentation device 104 can output for presentation.

To illustrate this, in another example, the modified sequence is the SECOND MODIFIED SEQUENCE 308 shown in FIG. 3. As shown, the SECOND MODIFIED SEQUENCE 308 includes the PROGRAM SEGMENT A, followed by the AD SEGMENT B' (which is the AD SEGMENT B modified with overlay content), followed by the AD SEGMENT C.

The content-modification system 100 could make use of fingerprint-based automated content recognition (ACR) to facilitate this or other such dynamic content modification.

In an example implementation, as the content-distribution system 102 distributes various channels of content, a fingerprint-generation engine (not shown) at the content-distribution system 102 can generate digital reference fingerprint data representing the content respectively of each such channel and can provide that reference fingerprint data along with associated metadata, such as channel identification and frame time stamps, to the fingerprint-matching server 106. Further, as the content-presentation device 104 receives a channel of content, the content-presentation device 104 can generate digital query fingerprint data representing the content of the channel that the content-presentation device 104 is receiving. And the content-presentation device 104 and fingerprint-matching server can make use of this digital reference fingerprint data and digital query fingerprint data as a basis to identify the channel that the content-presentation device 104 is receiving.

For instance, when the content-presentation device 104 first powers on, or in response to a channel change or other trigger event, the content-presentation device 104 can begin sending to the fingerprint-matching server 106 the latest generated query fingerprint data. And the fingerprint-matching server 106 can compare that query fingerprint data with the reference fingerprint data representing various channels, in an effort to find a match. Upon determining with sufficient certainty that the query fingerprint data matches the reference fingerprint data representing a particular channel (e.g., determining that at least a threshold degree of similarity exists between the query fingerprint data and the reference fingerprint data), the fingerprint-matching server 106 can thereby conclude that that is the channel that the content-presentation device 104 is receiving.

Further, once the fingerprint-matching server 106 has identified the channel that the content-presentation device 104 is receiving, the fingerprint-matching server 106 can start sending to the content-presentation device 104 sets of the reference fingerprint data representing that identified channel, to enable the content-presentation device 104 to monitor for a possible channel change, which could trigger identifying the channel once again.

Namely, upon identifying the channel that the content-presentation device 104 is processing, the fingerprint-matching server 106 can send to the content-presentation device 104 a set of the reference fingerprint data representing upcoming frames of that channel. And the content-presentation device 104 can conduct client-side fingerprint matching, comparing that reference fingerprint data with the latest generated query fingerprint data in an effort to find a match.

If the content-presentation device 104 thereby finds a fingerprint match with sufficient certainty, then the content-presentation device 104 can conclude that the content-presentation device 104 is continuing to receive the identified channel. And the content-presentation device 104 can periodically request a next set of the reference fingerprint data from the fingerprint-matching server 106 to facilitate continued monitoring for a channel change. Whereas, if the content-presentation device 104 detects a fingerprint mismatch, that mismatch can indicate that the content-presentation device 104 has changed channels, in which case the content-presentation device 104 can then start submitting query fingerprint data to the fingerprint-matching server 106, which could signify to the fingerprint-matching server 106 that the content-presentation device 104 has changed channels, and could cause and enable the fingerprint-matching server 106 to then newly identify the channel that the content-presentation device is receiving.

Alternatively or additionally, the fingerprint-matching server 106 itself can monitor for a channel change. In particular, after the content-presentation device's channel has been identified, the content-presentation device 104 can continue to send the latest generated query fingerprint data to the fingerprint-matching server 106. And the fingerprint-matching server 106 can compare this query fingerprint data with the reference fingerprint data representing the identified channel. If the fingerprint-matching server 106 then finds a fingerprint mismatch with sufficient certainty, then the fingerprint-matching server 106 can conclude that the content-presentation device 104 has changed channels.

In addition, the fingerprint-matching server 106 can have access to a modifiable content segment inventory database (not shown), such as an ad-inventory database, that contains digital fingerprints representing each of various modifiable content segments (i.e., content in the form of content segments that have been identified as candidates to be modified), such as ads, that could be present on particular channels. And the fingerprint-matching server 106 can make use of that modifiable content segment fingerprint data as a basis to determine when a given such modifiable content segment is present on a given channel. In particular, the fingerprint-matching server 106 can compare that modifiable content segment fingerprint data with the reference fingerprint data representing content of given channel. And upon determining with sufficient certainty that the fingerprint data representing a particular modifiable content segment matches the reference fingerprint data representing a channel of content, the fingerprint-matching server 106 can conclude that that modifiable content segment is present on that channel.

In practice, the fingerprint-matching server can also have access to the broadcast-schedule data noted above, which may indicate when particular modifiable content segments, such as particular ads, are scheduled to be present on particular channels and may indicate various information about each such scheduled modifiable content segment, such as an identifier of the segment, a duration of the segment, and a description of content of the segment. And the fingerprint-matching server 106 can conduct this fingerprint matching to detect the presence of a modifiable content segment during a range of time around when the schedule indicates that a modifiable content segment will be present, so as to conserve processing power.

Upon determining that a particular modifiable content segment, such as a particular ad, is present on a given channel, the fingerprint-matching server 106 can then work with each content-presentation device 104 that is receiving that channel, to facilitate dynamic content modification as noted above. For instance, having determined that content-presentation device 104 is receiving that channel, the fingerprint-matching server 106 can work with the content-presentation device 104 to facilitate the dynamic content modification.

In an example implementation, the fingerprint-matching server 106 can prepare the content-presentation device 104 in advance for such a dynamic content modification. For instance, the fingerprint-matching server 106 can use the above-noted broadcast-schedule data as a basis to determine well in advance, such as 5 minutes in advance, that the modifiable content segment is upcoming on the channel being processed by the content-presentation device. And based on that determination, the fingerprint-matching server 106 can responsively signal to the content-presentation device 104, to cause the content-presentation device 104 to prepare itself to carry out dynamic modification of that modifiable content segment at the upcoming time.

Alternatively or additionally, the fingerprint-matching server 106 can so prepare the content-presentation device 104 closer to, but still in advance of, the time of the content modification opportunity but still in advance. For instance, in response to the fingerprint-matching server 106 finding a fingerprint match that indicates the presence of the modifiable content segment on the channel, the fingerprint-matching server 106 can then signal to the content-presentation device 104, to cause content-presentation device 104 to prepare itself to carry out the dynamic content modification, or perhaps to proceed with the dynamic content modification that the fingerprint-matching server 106 earlier noted was upcoming.

This signaling between the fingerprint-matching server 106 and the content-presentation device 104, particularly after the fingerprint-matching server 106 has detected a presence of a particular modifiable content segment on the channel, can leverage a content-transmission delay that is likely to exist for transmission of content from the content-distribution system 102 to the content-presentation device 104. This delay could be on the order of 5-10 seconds. Given this or another such delay, the fingerprint-matching server 106 could engage in out-of-band (e.g., broadband Internet) signaling with the content-presentation device 104 to give the content-presentation device notice of the approaching content modification opportunity, with sufficient time for the content-presentation device 104 to timely carry out the dynamic content modification.

Further, the signaling from the fingerprint-matching server 106 to the content-presentation device 104, to prepare the content-presentation device 104 to carry out the dynamic content modification, can carry with it various information about the upcoming modifiable content segment. For instance, this information can include the above-noted information indicated by the broadcast-schedule data, such as an identifier, duration, and description of the modifiable content segment. And, particularly after the fingerprint-matching server has detected presence of a particular modifiable content segment on the channel, this information can include an indication of the specific start time of the upcoming modifiable content segment, so that the content-presentation device 104 can carry out the dynamic content modification starting at that time. For instance, the fingerprint-matching server 106 can provide the content-presentation device 104 with a frame time stamp denoting a time of the starting frame of the modifiable content segment on the channel, and the content-presentation device 104 can accordingly carry out the dynamic content modification at that time.

The content-presentation device's preparation to carry out the dynamic content modification can then involve the content-presentation device 104 becoming provisioned with supplemental content that the content-presentation device will substitute for the modifiable content segment in the channel or will overlay on the modifiable content segment in the channel, among other possibilities. For instance, the content-presentation device could obtain a link that points to the supplemental content so that the content-presentation device can receive the supplemental content from that link, and the content-presentation device may at least begin receiving and buffering the supplemental content from that link. And/or the content-presentation device could fully obtain a media file of the supplemental content.

The content-presentation device can become so provisioned with the supplemental content in various ways. In one example implementation, for instance, the content-presentation device 104 can send a request to the content-management system 108, providing in the request various information about the upcoming modifiable content segment such as the information noted above as well as information about the content-presentation device 104 and/or its users. And the content-management system 108 could respond to that request by selecting supplemental content that would be suitable for use to modify the modifiable content segment and providing the content-presentation device 104 with a link, such as a Uniform Resource Identifier (URI) or a Uniform Resource Locator (URL), pointing to that supplemental content at the supplemental-content-delivery system 112. Alternatively, the fingerprint-matching server 106 could work with the content-management system 108 to obtain such a link and could provide that link to the content-presentation device 104 in its signaling to the content-presentation device 104. The content-presentation device could then obtain or start obtaining the supplemental content from the supplemental-content-delivery system 112 at that link.

Moving on in view of the context provided above, FIGS. 4A, 4B, 4C, 4D, 4E, and 4F, collectively make up a table showing example time periods and example operations that can be performed in connection with the content-modification system 100. The operations shown in these figures could be performed in the order shown or in another order, possibly with some operations being performed concurrently with each other, among other possibilities.

C. Operations Related to the Content-Distribution System Transmitting First Content on a Channel In an example implementation, during time period T1, as the content-distribution system 102 transmits a representative channel to the content-presentation device 104, the content-distribution system 102 can transmit a first portion of that channel to the content-presentation device 104. This first portion of the channel is referred to herein as "first content." In one example, the first content is the FIRST CONTENT 310 shown in FIG. 3.

During a time period T2, the content-distribution system 102 can generate fingerprint data representing the first content. This fingerprint data is referred to herein as "first fingerprint data." The content-distribution system 102 can generate the first fingerprint data using any content fingerprinting process now known or later developed. By way of example, the content-distribution system 102 can generate the first fingerprint data by selecting multiple patches of a frame of video content and calculating a value for each of the selected multiple patches. In some instances, the values can include Haar-like features at different scales and in different locations of displayed regions of the frame of video content. Further, in some instances, the values can be derived from an integral image, which is a summed image where each pixel is a sum of values of the pixels above and to the left, as well as the current pixel. Using an integral image technique may increase the efficiency of the fingerprint generation.

The content-distribution system 102 can generate first fingerprint data at a given rate, such as at the rate of one fingerprint per frame of the first content. The first fingerprint data can be or include some or all of these generated fingerprints.

To generate the first fingerprint data, the content-distribution system 102 can access the first content at various points within the content-distribution system 102. As one example, the content-distribution system 102 can access the first content after it is output by a distribution amplifier within the content-distribution system 102.

Also during the time period T2, the content-distribution system 102 can generate metadata associated with the first content and/or the first fingerprint data. This metadata is referred to herein as "first metadata." In one example, the first metadata can be or include a transmission timestamp respectively per content frame or frame fingerprint, which represents a timepoint at which the content-distribution system 102 transmitted or otherwise processed that portion of the first content. The content-distribution system 102 can determine the transmission timestamp in various ways, such as based on a time clock that is synchronized to a server-side reference clock accessible to the content-distribution system.

As another example, the first metadata can be or include a channel identifier, which identifies the channel on which the content-distribution system 102 is transmitting the first content. The content-distribution system 102 can determine the channel identifier in various ways such as based on mapping data that maps the content-distribution system 102 and/or physical inputs and/or outputs within the content-distribution system 102 to respective channel identifiers. In one example, in the case where the content-distribution system 102 transmits content A on channel A, content B on channel B, and content C on channel C, the mapping data can specify which of three different outputs (perhaps on three different distribution amplifiers) maps to which channel identifier, such that the content-distribution system 102 can determine the appropriate channel identifier for content of a given channel.

As another example, the first metadata can be or include Society of Cable Television Engineers (SCTE)-104 data, watermark data, or a similar type of metadata, any of which can themselves encode other metadata, such as a program identifier, an ad identifier (e.g., an industry standard coding identification (ISCI) key), a program genre, or another type of textual or numeric metadata, for instance.

The content-distribution system 102 can associate the first fingerprint data with the first metadata in various ways. For instance, in the case where the first fingerprint data includes multiple fingerprints with each fingerprint representing a corresponding frame of the first content, the content-distribution system 102 can associate each fingerprint with a corresponding transmission timestamp and/or with other corresponding first metadata.

During a time period T3, the content-distribution system 102 can transmit the first fingerprint data and the first metadata to the fingerprint-matching server 106 or otherwise make that data available for access by the fingerprint-matching server 106. The content-distribution system 102 can transmit the first fingerprint data and the first metadata at a given interval. For example, every two seconds, the content-distribution system 102 can transmit the first fingerprint data and the first metadata that it generated during that most recent two-second time period.

D. Operations Related to the Content-Presentation Device Receiving Second Content Further, during an example time period T4, the content-presentation device 104 can receive a portion of the channel from the content-distribution system 102. This portion of the channel is referred to herein as "second content." In one example, the second content is the SECOND CONTENT 312 shown in FIG. 3.

During a time period T5, the content-presentation device 104 can generate fingerprint data representing the second content. This fingerprint data is referred to herein as "second fingerprint data." The content-presentation device 104 can generate the second fingerprint data using any content-fingerprinting process now known or later developed, such as the same process as that used by the content-distribution system 102 to generate the first fingerprint data. Further, the content-presentation device 104 can generate the second fingerprint data at various rates, such as at the rate of one fingerprint per frame of the second content. And the second fingerprint data can be or include some or all of these generated fingerprints.

To facilitate generation of this second fingerprint data, the content-presentation device 104 can access the second content at various points within the content-presentation device 104. As one example, the content-presentation device 104 can access the second content as it is being received by an input buffer (e.g., an HDMI buffer) of the content-presentation device 104. In another configuration, the content-presentation device 104 can access the second content as it is being received by a display buffer of the content-presentation device 104. Thus, the second content can be content that the content-presentation device 104 not only receives, but also outputs for presentation.

Also during the time period T5, the content-presentation device 104 can generate metadata associated with the second content and/or the second fingerprint data. This metadata is referred to herein as "second metadata." As one example, the second metadata can be or include a receipt timestamp respectively per content frame or frame fingerprint, which represents a timepoint at which the content-presentation device 104 received or otherwise processed that portion of second content. The content-presentation device 104 can determine the receipt timestamp in various ways, such as based on a time clock that is synchronized to a client-side reference clock accessible to the content-presentation device 104. In an example implementation, the point at which the content-presentation device 104 accesses the second content to facilitate generating the second fingerprint data could be considered the "receipt" point for purposes of determining the receipt timestamp.

In practice, while the first metadata is likely to be or include a channel identifier, the second metadata is likely to not be or include a channel identifier.

The content-presentation device 104 can associate the second fingerprint data with the second metadata in various ways. For instance, where the second fingerprint data includes multiple fingerprints with each fingerprint representing a corresponding frame of second content, the content-presentation device 104 can associate each second fingerprint with a corresponding receipt timestamp and/or other corresponding metadata.

As the content-presentation device 104 generates the second fingerprint data, and second metadata, the content-presentation device 104 could transmit that data to the fingerprint-matching server 106. Thus, during a time period T6, the content-presentation device 104 can transmit the second fingerprint data and the second metadata to the fingerprint-matching server 106. And the content-presentation device 104 can continue to do so at a given interval. For example, every two seconds, the content-presentation device 104 can transmit to the fingerprint-matching server 106 the second fingerprint data and the second metadata that it generated during that most recent two-second time period.

E. Operations Related to Identifying a Channel on Which the Content-Presentation Device is Receiving the Second Content As noted above, the fingerprint-matching server 106 can compare the query fingerprint data provided by the content-presentation device 104 with reference fingerprint data representing each of various channels, to determine what channel the content-presentation device 104 is currently processing.

During a time period T7, for instance, the fingerprint-matching server 106 can receive the first fingerprint data and the first metadata from the content-distribution system 102, with the first fingerprint data representing the first content provided by the content-distribution system 102 on the channel, and the first metadata identifying that channel. And during a time period T8, the fingerprint-matching server 106 can receive the second fingerprint data and the second metadata from the content-presentation device 104, with the second fingerprint data representing the second content received by the content-presentation device 104, and the second metadata perhaps not identifying the channel (i.e., where the channel is as yet unidentified).

During a time period T9, the fingerprint-matching server 106 can then compare the first fingerprint data and the second fingerprint data to determine whether there is a match, and during a time period T10, based on the comparing, the fingerprint-matching server 106 can detect a match between the first fingerprint data and the second fingerprint data. In this disclosure, this type of match attempt, namely a match attempt between (i) reference fingerprint data representing content being transmitted on an identified channel and (ii) query fingerprint data representing content being received on an unidentified channel, is referred to herein as a "cold match attempt."

The fingerprint-matching server 106 can compare and/or detect a match between the fingerprint data and the second fingerprint data using any content fingerprint comparing and matching technique now known or later developed. By way of example, the first fingerprint data may include a first group of fingerprints, and the second fingerprint data may include a second group of fingerprints. The fingerprint-matching server 106 can determine that the first group of fingerprints match the second group of fingerprints upon determining that a similarity between each of the query fingerprints and each of the respective reference fingerprints satisfies a predetermined threshold associated with a Tanimoto distance measurement, a Manhattan distance measurement, and/or other distance measurements associated with matching images or other visual-based content.

Further, to effectively compare the first fingerprint data and the second fingerprint data, the fingerprint-matching server 106 may need to account for the content-transmission delay noted above. In practice, for instance, where the content-distribution system 102 transmits a given frame of content on a given channel at a time point A, for various reasons the content-presentation device 104 may not receive that frame until a time point B that is later (e.g., ten seconds later) than the time point A.

In one example, the time point A, the time point B, and the content-transmission delay can be the TIME POINT A 314, the TIME POINT B 316, and the CONTENT-TRANSMISSION DELAY 318, respectively, shown FIG. 3. Note that FIG. 3 is for illustration purposes and is not necessarily to scale at least with respect to time. In practice, the actual amount of content-transmission delay may be different from the amount shown.

To help the fingerprint-matching server 106 effectively compare the first fingerprint data with the second fingerprint data, the fingerprint-matching server 106 may need to account for this content-transmission delay. In one example, the fingerprint-matching server 106 can do this by comparing the first fingerprint data that it receives at a receipt time point with the second fingerprint data that it receives during a time period defined by a starting time point and an ending time point. The starting time point can be the receipt time point plus an offset representing an anticipated content-transmission delay (e.g., ten seconds), minus a tolerance a time period (e.g., two seconds). The ending time point can be the receipt time point plus the offset (e.g., ten seconds), plus the tolerance a time period (e.g., two seconds). As such, in one example where the anticipated content-transmission delay is 10 seconds, the fingerprint-matching server 106 can compare first fingerprint data that it receives at a receipt time point with second fingerprint data that it receives during a time period between (i) the receipt time point plus eight seconds and (ii) receipt time point plus twelve seconds.

In some cases, the fingerprint-matching server 106 can determine a content-transmission delay, which it can use to select an appropriate offset for use in determining the starting and ending time points, as described above. The fingerprint-matching server 106 can determine the content-transmission delay in various ways. For example, after the fingerprint-matching server 106 detects a match based on a cold match attempt, the fingerprint-matching server 106 can determine the content-transmission delay as a difference between the corresponding transmission timestamp (of the first metadata) and the corresponding receipt timestamp (of the second metadata), for example. Further, this content-transmission delay may vary from channel to channel.

During a time period T11, based on the detected match between the first fingerprint data and the second fingerprint data, the fingerprint-matching server 106 can identify the channel on which the second content is being received by the content-presentation device 104. In one example, the fingerprint-matching server 106 can identify the channel based on the channel identifier metadata associated with the first fingerprint data used to detect the match.

In practice, since there are likely to be multiple potential channels on which the content-presentation device 104 is receiving the second content, the fingerprint-matching server 106 could carry out this fingerprint comparison process with respect to reference fingerprint data representing multiple channels. Namely, the fingerprint-matching server 106 could compare the second fingerprint data with multiple instances of first fingerprint data, each representing content of a different respective channel, to determine which of those multiple instances matches the second fingerprint data and thus to determine what channel the content-presentation device is receiving.

Also, in some cases, the fingerprint-matching server 106 can detect a match between the second fingerprint data and each of multiple instances of first fingerprint data, each representing content of a different respective channel. This is referred to herein as a "multimatch scenario" and can occur for various reasons. For example, this can occur when the content-distribution system 102 or multiple content distribution systems transmit the same or similar content on more than one channel at or about the same time. Upon detecting a multimatch scenario, the fingerprint-matching server 106 can perform additional operations to disambiguate—to determine, from among the multiple matching channels, which specific channel the content-presentation device 104 is receiving. The fingerprint-matching server 106 can do this using any channel multimatch disambiguation technique now known or later developed.

By way of example, responsive to determining that a fingerprint of the second fingerprint data matches multiple fingerprints of the first fingerprint data, each representing a different respective channel, the fingerprint-matching server 106 can (i) identify a fingerprint feature that differs as between the multiple fingerprints of the first fingerprint data and (ii) determine that a fingerprint of the second fingerprint data matches just one of the multiple fingerprints as to the identified fingerprint feature. Identifying the fingerprint feature can involve (i) referring to data that indicates a region of a frame that is channel specific to determine a region that is channel specific and (ii) identifying as the fingerprint feature a fingerprint feature corresponding with the determined region. The determined region can include a video frame edge or a region where channel identification is presented, for instance.

Note also that, as discussed above, once the fingerprint-matching server 106 has identified the channel that the content-presentation device 104 is receiving, the fingerprint-matching server 106 can then begin sending to the content presentation device 104 reference fingerprint data representing that identified channel, to enable the content-presentation device 104 to monitor for a possible channel change. For instance, after finding that the first fingerprint data matches the second fingerprint data, the fingerprint-matching server 106 can send to the content-presentation device 104 a set of the reference fingerprint data representing upcoming frames of the identified channel, and the content-presentation device 104 can then periodically request a further set of the reference fingerprint data. Based on a comparison of that reference fingerprint data with the query fingerprint data representing the channel that the content-presentation device 104 is receiving, the content-presentation device can then determine if and when the content-presentation device 104 changes channels, and upon changing channels can then signal to the fingerprint-matching server to trigger new cold matching.

Alternatively or additionally, as also discussed above, the content-presentation device 104 can send the query fingerprint data to the fingerprint-matching server 106 so that the fingerprint-matching server 106 can compare that query fingerprint data to reference fingerprint data. The fingerprint-matching server 106 can determine if and when the content-presentation device 104 changes channels.

F. Operations Related to Establishing Historical Content-Consumption Data

In an example implementation, the fingerprint-matching server 106, the data-management system 110, and/or one or more other entities in or associated with the content-modification system 100 could establish historical content-consumption data associated with the content-presentation device 104 and/or users of the content-presentation device 104. For instance, based on the cold matching noted above or other such processes, one or more such entities could establish data that indicates what channels the content-presentation device 104 received, and when the content-presentation device 104 changed channels, possibly in correlation with what programming and/or ads were on particular channels at the time.

Continuing with reference to FIGS. 4A-4F, for instance, once the fingerprint-matching server 106 identifies the channel that the content-presentation device 104 is receiving, during a time period T12 the fingerprint-matching server 106 can generate and store metadata associated with the identified channel. For example, the metadata can include a channel identifier, an associated timestamp, and an identifier of the content-presentation device 104, all of which the fingerprint-matching server 106 could determine in various ways. For instance, the fingerprint-matching server 106 could determine the channel identifier from the first metadata associated with the matching reference fingerprint data.

Further, the fingerprint-matching server 106 could determine the associated timestamp according to a server-side reference clock. And the fingerprint-matching server 106 could determine the content-presentation-device identifier based on one transmitted to the fingerprint-matching server and/or by mapping other data (e.g., device registration data) provided by the content-presentation device 104 to a device identifier, among other possibilities.

During a time period T13, the fingerprint-matching server 106 could then transmit an indication of the identified channel and the associated metadata to the data-management system 110, and in time period T14, the data-management system 110 can receive the indication of the identified channel and the associated metadata from the fingerprint-matching server 106.

During time period T15, the data-management system 110 could then establish and record historical content consumption data associated with the content-presentation device 104. For instance, the data-management system 110 could use the received indication of the identified channel and the associated metadata, perhaps with other data, to determine when the content-presentation device 104 has received content on the identified channel, what specific content the content-presentation device 104 has received, when the content-presentation device has changed channels, etc. By way of example, the data-management system 110 could likewise have access to the broadcast-schedule data noted above, and the data-management system 110 could correlate the received channel identification and associated metadata with the schedule data to establish a record of what programing and/or ads the content presentation device 104 was processing for presentation at what times, and perhaps what programming or ads the content-presentation device 104 switched away from.

G. Operations Related to the Content-Distribution System Transmitting Third Content As noted above, the content-distribution system 102 may continue to transmit content on the identified channel to the content-presentation device 104. Thus, after having transmitted first content to the content-presentation device as noted above, the content-distribution system 102 can transmit a subsequent portion of the content of the identified channel to the content-presentation device 104. This subsequent portion of the content is referred to herein as "third content." In one example, the third content is the THIRD CONTENT 320 shown in FIG. 3. In practice, the content-distribution system 102 is likely to transmit the third content shortly after (e.g., immediately after or a few seconds or minutes after) transmitting the first content.

Further as noted above, the content-distribution system 102 could generate and provide reference fingerprint data on an ongoing basis. Thus, during a time period T17, the content-distribution system 102 can generate fingerprint data representing the third content. This fingerprint data is referred to herein as "third fingerprint data." Further, during the time period T17, the content-distribution system 102 can generate metadata associated with the third content and/or the third fingerprint data. This metadata is referred to herein as "third metadata." And the content-distribution system 102 can associate the third fingerprint data with the third metadata. In addition, during a time period T18, the content-distribution system 102 can transmit the third fingerprint data and the third metadata to the fingerprint-matching server 106.

The content-distribution system 102 can transmit the third content, generate the third fingerprint data, generate the third metadata, associate the third fingerprint data with the third metadata, and transmit the third fingerprint data and the third metadata in various ways, such as ways that are the same as or similar to those described above in connection with transmitting the first content, generating the first fingerprint data, generating the first metadata, associating the first fingerprint data with the first metadata, and transmitting the first fingerprint data and the first metadata.

H. Operations Related to the Content-Management System Receiving a Modifiable Content-Segment As noted above, the fingerprint-matching server 106 could have access to a database of fingerprint data representing various modifiable content segments, such as ads, that could be present on channels. In an example implementation, the content-management system 108 could be responsible for establishing data to populate that database.

In practice, for instance, the content-management system 108 could receive various modifiable content segments and could generate digital fingerprint data representing each such modifiable content segment and store that fingerprint data and associated metadata regarding the modifiable content segments, for reference by the fingerprint-matching server 106. Or the content-management system 108 could transmit the modifiable content segment fingerprint data and associated metadata to the fingerprint-matching server 106 and the fingerprint-matching server 106 could store that data in the database, among other possibilities.

Further, the content-management system 108 could receive or establish metadata regarding each such modifiable content segment and could store the metadata in association with the modifiable content segment fingerprint data, or cause the fingerprint-matching server 106 to so store the metadata. This metadata per modifiable content segment could include assorted information about the modifiable content segment, such as duration of the modifiable content segment, a descriptor or classification of the modifiable-segment and various information about permissible times and/or ways in which the modifiable content segment can be modified, among other possibilities.

Thus, by way of example, during a time period T19, the content-management system 108 can receive a modifiable content segment, i.e., content in the form of a content segment that has been identified as a candidate to be modified, also referred to herein as "fourth content." As discussed above, a modifiable content segment is content in the form of a content segment that has been identified as a candidate to be modified. In one example, the modifiable content segment is the MODIFIABLE CONTENT SEGMENT shown in FIG. 3. In practice, for instance, the content-modification system 108 can receive this modifiable content segment as a media file transmitted from or provided by a content provider and/or by a user associated with the system.

The modifiable content segment can take various forms. For example, the modifiable content segment can be an ad segment (e.g., a commercial) or a program segment. As such, in one example, the modifiable content segment can be an ad segment that has been identified as a candidate to be modified, perhaps by way of being replaced with a different ad segment, and/or by way of having content overlaid thereon.

During a time period T20, the content-management system 108 can generate fingerprint data representing the modifiable content segment. This fingerprint data is referred to herein as "fourth fingerprint data." The content-management system 108 can generate the fourth fingerprint data using any fingerprint generation technique now known or later developed, again such as the same as that noted above.

The content-management system 108 can generate the fourth fingerprint data at a given rate, such as at the rate of one fingerprint per frame of the fourth content. The fourth fingerprint data can be or include some or all of these generated fingerprints.

Also during the time period T20, the content-management system 108 can generate and/or receive metadata associated with the modifiable content segment and/or the fourth fingerprint data. This metadata is referred to herein as "fourth metadata."

As noted above, this fourth metadata could include a duration of the modifiable content segment. The content-management system 108 could determine this duration in various ways, such as based on the fingerprint generation process. For example, if the content-management system 108 generates the fourth fingerprint data as one fingerprint per frame, where the modifiable content segment has a frame rate of 30 frames per second, and where the fingerprinting process results in 300 fingerprints being generated, the content-management system 108 can deduce that the modifiable content segment has a duration of ten seconds. Further, the metadata could include other information as noted above, among other possibilities During a time period T21, the content-management system 108 can transmit the fourth fingerprint data and the fourth metadata to the fingerprint-matching server 106, and the fingerprint-matching server 106 could store that data for reference. Or as noted above, the content-management system 108 could store the data in the modifiable content segment database for reference by the fingerprint-matching server 106.

I. Operations Related to the Fingerprint-Matching Server Identifying an Upcoming Content Modification Opportunity on the Identified Channel During a time period T22, the fingerprint-matching server 106 can receive the third fingerprint data and the third metadata from the content-distribution system 102. As noted above, the third fingerprint data represents the third content transmitted by the content-distribution system 102 on the identified channel.

Further, during a time period T23, the fingerprint-matching server 106 can receive the fourth fingerprint data and the fourth metadata from the content-management system 108. Alternatively, the fingerprint-matching server 106 could access the fourth fingerprint data and fourth metadata from a modifiable content segment database.

During a time period T24, the fingerprint-matching server 106 can compare at least a portion of the third fingerprint data with at least a portion of the fourth fingerprint data to determine whether there is a match.

During a time period T25, based on the comparing, the fingerprint-matching server 106 can detect a match between at least the portion of the third fingerprint data and at least the portion of the fourth fingerprint data. The fingerprint-matching server 106 can compare and/or detect a match between fingerprint data using any content fingerprint comparing and matching process now known or later developed.

During a time period T26, based on the detected match, the fingerprint-matching server 106 can determine that at least a portion of the modifiable content segment is included within the third content, and therefore can determine that the modifiable content segment is present on the identified channel and is thus an upcoming content modification opportunity for the content-presentation device 104 on that channel. For example, the fingerprint-matching server 106 can determine that at least a beginning portion of the MODIFIABLE CONTENT SEGMENT is included within the THIRD CONTENT 320, as shown in FIG. 3, and therefore can identify an upcoming content modification opportunity.

In the present example, the third content as shown in FIG. 3 encompasses a start of the modifiable content segment on the channel being distributed by the content-distribution system 102. And the third metadata could include frame timestamp data indicating timing of frames of the third content. When the fingerprint-matching server 106 finds a match between the third fingerprint data and the modifiable content segment fingerprint data, the fingerprint-matching server 106 could thereby determine what frame of the third content is the starting frame of the modifiable content segment and could in turn determine from the third metadata the frame timestamp of the start of the modifiable content segment.

In practice, where there are multiple potential modifiable content segments, the fingerprint-matching server 106 could compare at least a portion of the third fingerprint data with at least a portion of each of multiple instances of fourth fingerprint data, each representing a different respective modifiable content segment, to determine which of instance of the fourth fingerprint data has a portion that matches the at least a portion of the third fingerprint data, and thus to determine which modifiable content segment is present on the channel.

Further, as noted above, the fingerprint-matching server 106 could conduct this matching of the third fingerprint data with the modifiable content segment fingerprint data in response to broadcast-schedule data indicating that a particular modifiable content segment is scheduled to be present on the channel. In practice, for instance, the fingerprint-matching server 106 could conduct the matching during a time range from a few minutes before the schedule time to a few minutes after the scheduled time, to account for possible variations in timing of modifiable content segment placement.

J. Operations Related to Preparing the Content-Presentation Device to Perform a Content-Modification Operation in Connection with the Identified Upcoming Content Modification Opportunity As noted above, the fingerprint-matching server 106 could prepare the content-presentation device 104 to conduct dynamic content modification, by signaling with the content-presentation device 104 in advance. For instance, the fingerprint-matching server 106 could so signal to the content-presentation device 104 initially based on broadcast-schedule data indicating when a particular modifiable content segment is scheduled to be upcoming on the identified channel. Further, the fingerprint-matching server 106 could so signal to the content-presentation device 104 upon detecting a match between the reference fingerprint data representing the identified channel and the modifiable content segment fingerprint data representing the modifiable content segment.

Once the fingerprint-matching server 106 has found a fingerprint match that indicates the presence of the modifiable content segment on the identified channel and indicates the starting time of that modifiable content segment on the channel, the fingerprint-matching server 106 could further provide the content-presentation device 104 with an indication of the start time of the modifiable content segment. And the fingerprint-matching server 106 could also continue to provide the content-presentation device 104 with the third fingerprint data and third metadata, to enable the content-presentation device 104 to conduct client-side fingerprint matching to monitor for a possible channel change.

By way of example, during a time period T27, based on the detected match between the third fingerprint data and the modifiable content segment data, the fingerprint-matching server 106 can transmit the third fingerprint data and the third metadata to the content-presentation device 104 data to facilitate preparing the content-presentation device 104 to perform a content modification operation in connection with the identified upcoming content modification opportunity. And during a time period T28, the content-presentation device 104 can receive the third fingerprint data and the third metadata from the fingerprint-matching server 106.

This third fingerprint data could be a latest set of reference fingerprint data that the fingerprint-matching server 106 provides to the content-presentation device, or the fingerprint-matching server may provide this third fingerprint data in response to detecting the upcoming content modification opportunity. Further, the fingerprint-matching server 106 could add to this third metadata an indication of which frame timestamp represents the start of the modifiable content segment, so that the third metadata as received by the content-presentation device 104 would indicate that modifiable content segment start time. Or the fingerprint-matching server 106 could otherwise inform the content-presentation device 104 of the modifiable content segment start time.

Further, during a time period T29, as the content-presentation device continues to receive content on the identified channel, the content-presentation device 104 can receive a segment of that content that encompasses the start of the modifiable content segment. This segment is referred to herein as "fifth content." In one example, the fifth content is the FIFTH CONTENT 324 shown in FIG. 3.

In view of the content-transmission delay noted above, the content-presentation device 104 can receive the third fingerprint data and the third metadata from the fingerprint-matching server 106 before the content-presentation device 104 receives the fifth content from the content-distribution system 102. Thus, the content-presentation device 104 can receive fingerprint data representing content that the content-presentation device 104 is expecting to receive shortly thereafter, and the content-presentation device 104 should then actually receive that content unless an interruption event such as a channel-change event occurs.

In practice, similar to how the content-distribution system 102 is likely to transmit the third content shortly after (e.g., immediately after or a few seconds or minutes after) transmitting the first content, the content-presentation device 104 is likely to receive the fifth content shortly after (e.g., immediately after or a few seconds or minutes after) receiving the second content.

During a time period T30, the content-presentation device 104 can output for presentation at least a portion of the fifth content. For example, referring to FIG. 3, the content-presentation device can output for presentation the portion of the FIFTH CONTENT 324 that is the end portion of the PROGRAM SEGMENT A.

As noted above, the content-presentation device 104 could generate query fingerprint data on an ongoing basis, which the content-presentation device 104 could regularly compare with reference fingerprint data provided by the fingerprint-matching server, to monitor for a possible channel change. During a time period T31, the content-presentation device 104 can thus generate query fingerprint data representing the fifth content. This new query fingerprint data is referred to herein as "fifth fingerprint data."

Also during the time period T31, the content-presentation device 104 can generate metadata associated with the fifth content and/or the fifth fingerprint data. This metadata is referred to herein as "fifth metadata."

The content-presentation device 104 can receive the fifth content, generate the fifth fingerprint data, generate the fifth metadata, associate the fifth fingerprint data with the fifth metadata in various ways, such as ways that are the same as or similar to those described above in connection with receiving the second content, generating the second fingerprint data, generating the second metadata, and associating the second fingerprint data with the second metadata.

During a time period T32, the content-presentation device 104 can compare the third fingerprint data and the fifth fingerprint data to determine whether there is a match. And during a time period T33, based on the comparing, the content-presentation device 104 can detect a match between the third fingerprint data and the fifth fingerprint data. In this disclosure, this type of match attempt, namely a match attempt between (i) reference fingerprint data representing content transmitted by the content-distribution system 102 on an identified channel (at least based on the most recent channel identification analysis), and (ii) query fingerprint data representing content being received by the content-presentation device 104 on the same identified channel, is referred to herein as a "hot match attempt." The content-presentation device 104 can compare and/or detect a match between fingerprint data using any content fingerprint comparing and matching process now known or later developed.

During a time period T34, based on the detected match and/or based on the timing information provided by the fingerprint-matching server 106, the content-presentation device 104 can determine a time point at which the identified upcoming modification opportunity starts. This is referred to herein as the "modification start time." In one example, the modification start time is the MODIFICATION START TIME 326 as shown FIG. 3.

In one example, the content-presentation device 104 can determine the modification start time by starting with the transmission timestamp associated with the starting frame marker (which, as described above, can be or be included in the third metadata) and adding the content-transmission delay to that transmission timestamp, to arrive at the modification start time according to the client-side reference clock.

In practice, the content-presentation device 104 can determine the content-transmission delay as a time offset between a server-side reference clock (e.g. used by the content-distribution system 102 and/or the fingerprint-matching server 106) and a client-side reference clock used by the content-presentation device 104. For instance, the content-presentation deice 104 could engage in a process to establish synchronous lock between such server time and client time, which could represent a time offset between timestamps associated with the third content, the third fingerprint data, and/or the third metadata on the one hand, and the fifth content, the fifth fingerprint data, and/or the fifth metadata, on the other hand.

The content-presentation device 104 can establish the synchronous lock using any synchronous-lock technique now known or later developed. By way of example, the fingerprint-matching server 106 can transmit to the content-presentation device 104 at least a portion of the third fingerprint data, and the content-presentation device 104 can increase the frame rate at which the content-presentation device 104 generates query fingerprint data, so that the content-presentation device 105 generates the fifth fingerprint data at a greater frame rate for instance. The content-presentation device 104 can then use the third and fifth fingerprint data—namely, the timestamps at which the third and fifth fingerprint data were generated—as a basis to establish synchronous lock (e.g., a time offset) between (i) true time defined along a timeline within the content being transmitted by the content-distribution system 102 and (ii) client time defined according to a clock of the content-presentation device 104. Alternatively, the fingerprint-matching server 106 can establish synchronous lock in a similar manner and can then inform the content-presentation device 104.

The content-presentation device 104 can then determine the modification start time by adding that determined time offset to the modification start time indicated by the third metadata. Namely, if the modification start time indicated by the third metadata denotes the server-side time when the content modification opportunity starts, the content-presentation device can convert that time value into a client-side modification-start time by adding to it the determined time offset representing the difference between server-side time and client-side time.

Also during the time period T34, based on the detected match, the content-presentation device 104 can determine a time point at which the identified upcoming modification opportunity ends. This is referred to herein as the "modification end time." In one example, the modification end time is the MODIFICATION END TIME 328 as shown FIG. 3.

In one example, the content-presentation device 104 can determine the modification end time by starting with the modification start time and adding the duration of the modifiable content segment (which, as described above, can be or be included in the fourth metadata) to the modification start time, to arrive at the modification end time.

In practice, if the content-presentation device 104 performs a hot match attempt and does not detect a match, the content-presentation device 104 can determine that the content-presentation device 104 is no longer receiving content on the most recently identified channel—perhaps because the content-presentation device 104 has changed channels. In response, the content-presentation device 104 can therefore forgo starting the planned dynamic content modification as to the modifiable content segment that the fingerprint-matching server determined to be present on the identified channel, or the content-presentation device 104 can discontinue that content modification if the content-presentation device 104 had started it already. Further, as noted above, the content-presentation device 104 could then signal to the fingerprint-matching server 106 to trigger new cold matching.

As also noted above, the content-presentation device 104 can prepare to carry out a dynamic content modification by obtaining supplemental content that the content-presentation device will insert in place of or as an overlay on the modifiable content segment.

During a time period T35, for instance, or perhaps in response to earlier signaling from the fingerprint-matching server 106 as noted above, the content-presentation device 104 can transmit to the content-management system 108 a request for supplemental content for use in connection with performing the content modification operation. In one example, the content-presentation device 104 can transmit the request before the modification start time (e.g., ten seconds before).

In an example implementation, when the fingerprint-matching server 106 signals to the content-presentation device 104 to inform the content-presentation device 104 of the upcoming content modification opportunity, the fingerprint-matching server 106 could including in its signaling to the content-presentation device 104 various information that could facilitate selection of a suitable supplemental-content segment to replace or overlay the modifiable content segment.

For instance, the fingerprint-matching server 106 could specify an identifier, duration, and various descriptors of the modifiable content segment, which the fingerprint-matching server 106 may glean from the broadcast-schedule data and/or from the modifiable content segment metadata, among other possibilities. In the request for supplemental content that the content-presentation device 104 sends to the content-management system 108, the content-presentation device 104 could then include the information provided by the fingerprint-matching server 106, as well as other information such as the frame format or video resolution at issue and an identifier of the content-presentation device, among other possibilities.

During a time period T36, the content-management system 108 can thus receive the request from the content-presentation device 104 and use the information in the request as a basis to select supplemental content from among multiple supplemental content items that are available for selection. Further, the content-management system 108 can also receive and consider various other data to help inform which supplemental content to select. For example, the content-management system 108 can receive historical content consumption data for the content-presentation device 104 from the data-management system 110 and/or the content-management system 108 can receive demographics data regarding users of the content-presentation device from a demographic data provider. And the content-management system 108 can use the received historical-content-consumption data and/or the received demographics data as a further basis to select the supplemental content.

The content-management system 108 can then cause the selected supplemental content to be transmitted to the content-presentation device 104. In one example, the content-management system 108 can do this by communicating with the supplemental-content delivery system 112 that can host the supplemental content. The supplemental-content delivery system 112 can take various forms and can include various components, such as a content distribution network (CDN).

For instance, during a time period T37, the content-management system 108 can transmit to the supplemental-content delivery system 112 a request for a link (e.g., a URL or URI) pointing to the hosted supplemental content. And during a time period T38, the supplemental-content delivery system 112 can receive and respond to the request for the link by transmitting the requested link to the content-management system 108. During a time period T39, the content-management system 108 can then in turn transmit the link to the content-presentation device 104.

During a time period T40, the content-presentation device 104 can thus receive this link, which it can use to retrieve the supplemental content from the supplemental-content delivery system 112, such that the content-presentation device 104 can use the retrieved supplemental content in connection with performing the content modification operation. In one example, the content-presentation device 104 can retrieve the supplemental content and store the supplemental content in a data-storage unit of the content-presentation device 104. Further, the content-presentation device 104 can receive the supplemental content as a real-time media stream, which the content-presentation device 104 can buffer and playout to implement the content modification.

As such, in some examples, the content-presentation device 104 can receive the modifiable content segment from one source (e.g., the content-distribution system 102), and the supplemental content from another source (e.g., the supplemental-content delivery system 112). These segments can be transmitted to, and received by, the content-presentation device 104 in different ways. For example, the content-distribution system 102 can transmit, and the content-presentation device 104 can receive, the modifiable content segment as a broadcast stream transmission, whereas the supplemental-content delivery system 112 can transmit, and the content-presentation device 104 can receive, the supplemental content as an over-the-top (OTT) transmission. In this context, in one example, the content-distribution system 102 can receive the modifiable content segment via one communication interface (e.g., an HDMI interface), and the content-presentation device 104 can receive the supplemental content via a different communication interface (e.g., an Ethernet or WI-FI interface).

K. Operations Related to the Content-Presentation Device Performing a Content-Modification Operation At a time period T41, the content-presentation device 104 can perform the content modification operation. The content-presentation device 104 can do this in various ways, perhaps depending on the type of content modification operation to be performed.

In one example, the content-presentation device 104 performing a content modification operation can involve the content-presentation device 104 modifying the modifiable content segment by replacing it with supplemental content. This is referred to herein as a "content-replacement operation." For example, in this scenario, the content-presentation device 104 can receive a linear sequence of content segments that includes the modifiable content segment and the associated metadata, and can also receive the supplemental content segment, as described above. The content-presentation device 104 can output for presentation the sequence of content segments up until the modification start time (which corresponds to the start of the modifiable content segment), at which time the content-presentation device 104 can switch to outputting for presentation the supplemental content instead. Then, at the modification end time (which corresponds to the end of the modifiable content segment), the content-presentation device 104 can switch back to outputting for presentation the content that follows in the linear sequence of content segments (or perhaps to other content, such as additional supplemental content that is replacing another modifiable content segment).

In one example, the operation of the content-presentation device 104 switching from outputting the sequence of content segments to outputting the supplemental content can involve using various buffers of the content-presentation device 104. For example, this can involve the content-presentation device 104 switching from using first data in a first input buffer where the sequence of content segments is being received to using second data in a second input buffer where the supplemental content is being received, to populate a display buffer.

As such, according to one example as illustrated in FIG. 3, by performing a content replacement operation, the content-presentation device 104 can replace the AD SEGMENT B with the AD SEGMENT D. As a result, rather than outputting for presentation the RECEIPT SEQUENCE 304, the content-presentation device can instead output for presentation the FIRST MODIFIED SEQUENCE 306.

In another example, the content-presentation device 104 performing a content modification operation can involve the content-presentation device 104 modifying a modifiable content segment by overlaying on the modifiable content segment, overlay content (referred to herein as a "content overlay operation"). For example, in this scenario, the content-presentation device 104 can again receive a linear sequence of content segments that includes the modifiable content segment and the associated metadata, and the content-presentation device 104 can also receive the supplemental content, as described above.

The content-presentation device 104 can then output for presentation the modifiable content segment as it ordinarily would, except that starting at the modification start time, the content-presentation device 104 can start overlaying the supplemental content on the modifiable content segment. The content-presentation device 104 can continue overlaying the supplemental content until the modification end time. In this way, the content-presentation device 104 can overlay the supplemental content during at least some temporal portion of the modifiable content segment.

In one example, the operation of the content-presentation device 104 overlaying supplemental content on the modifiable content segment can involve using various buffers of the content-presentation device 104. For example, this can involve the content-presentation device 104 using a portion of first data in a first input buffer where the sequence of content segments is being received together with second data in a second input buffer where the supplemental content is being received, for the purposes of populating a display buffer. In this way, the content-presentation device can combine relevant portions of the modifiable content segment (i.e., all portions except those representing region where the supplemental content is to be overlaid) together with the supplemental content to be used as an overlay, to create the desired modifiable content segment plus the supplemental content overlaid thereon.

As such, according to one example as illustrated in FIG. 3, by performing a content overlay operation, the content-presentation device 104 can overlay supplemental content on the AD SEGMENT B, thereby modifying it to AD SEGMENT B'. As a result, rather than outputting for presentation the RECEIPT SEQUENCE 304, the content-presentation device can instead output for presentation the SECOND MODIFIED SEQUENCE 308.

In some examples, the content-presentation device 104 can perform an entirety of a content modification operation (e.g., a replacement or overlay action, as described above) while tuned to the channel on which the RECEIPT SEQUENCE 304 is received, unless an intervening event occurs that might cause the content modification operation (or the output of the resulting content) to be stopped, such as a channel change or a powering down of the content-presentation device 104 and/or associated presentation device. Thus, the FIRST MODIFIED SEQUENCE 306 or the SECOND MODIFIED SEQUENCE 308 can be output on the same channel on which the content-presentation device 104 is tuned—that is, the channel on which the modifiable content segment is received and on which the content modification opportunity was identified.

L. Tracking and Reporting Operation-Related Data

To help facilitate performance of various operations such as the content-presentation device 104 performing a content modification operation and to help allow for the tracking and reporting of such operations, the content-modification system 100 and/or components thereof can track and report various operation-related data at various times and in various ways.

As just a few illustrative examples, responsive to certain operations being performed, such as those described herein, the fingerprint-matching server 106, the content-presentation device 104, and/or another entity can generate, store, and/or transmit messages that indicate (i) that a modifiable content segment has been identified, (ii) that a channel has been identified/confirmed (perhaps based on a match detected as a result of a cold or hot match attempt), (iii) that an upcoming content modification opportunity on the identified channel has been identified, (iv) that supplemental content has been requested, (v) that supplemental content has been received, (vi), that a content modification operation has started, (vii) that a content modification operation has ended, and/or (viii) that a scheduled content modification operation was aborted and/or not performed for any given reason. In some cases, these messages can include other metadata related to these operations. For example, the metadata can specify relevant timing information, device identifiers, channel identifiers, content segment identifiers, etc.

M. Watermark-Based Techniques

Although this disclosure has described the content-modification system 100 using fingerprint-based technology to perform various operations and to provide various features, in some examples, the content-modification system 100 can use watermark-based techniques instead of, or in addition to, fingerprint-based techniques, to perform these and other operations and to provide these and other features.

For example, as an alternative to the fingerprint-based technique described above in which the fingerprint-matching server 106 identifies the channel on which the second content is being received by the content-presentation device 104, the content-distribution system 102 or another entity can insert a channel identifier in the form of a watermark into the first content 310, to be received by the content-presentation device 104 as the second content 312, such that the content-presentation device 104, or another entity can extract the channel identifier and use it to identify the channel on which the second content is being received by the content-presentation device 104.

In this context, the content-modification system 100 can employ any watermark technique now known or later developed.

N. Using Primary and Backup Instances of Supplemental Content to Facilitate Dynamic Content Modification A representative content-modification system such as that described above can be used to facilitate dynamic replacement of advertisements in a linear media stream. In practice, for instance, content-management system 108 could populate an ad-inventory database with ad-fingerprint data representing respectively each of various replaceable advertisements. Further, based on broadcast-schedule data and/or fingerprint-matching between that ad-fingerprint data and reference-fingerprint data provided by the content-distribution system 102, the fingerprint-matching server 106 could determine when a given ad is or will be present on a given linear broadcast channel. And having determined that a given content-presentation device 104 is receiving that given channel, the fingerprint-matching server 106 could then work with that content-presentation device 104 to facilitate having the content-presentation device 104 dynamically replace that ad with a replacement ad.

More particularly, as noted above, the fingerprint-matching server 106 could first determine based on broadcast-schedule data that an ad is scheduled to be present on the channel at an upcoming time point (e.g., 5 minutes in advance), perhaps doing so respectively with respect to each of various such ads that could be handled by the system. And the fingerprint-matching server 106 could then signal to each content-presentation device that is receiving that channel, such as content-presentation device 104, to cause each such content-presentation device to prepare itself to replace the ad. This signaling from the fingerprint-matching server could carry with it various information about the upcoming ad as described above.

In response to receiving this signaling from the fingerprint-matching server 106, content-presentation device 104 could then work to become provisioned with a replacement ad that content-presentation device 104 can substitute for the upcoming replaceable ad. For instance, as noted above, the content-presentation device 104 could send to the content-management system 108 a request for a replacement ad, providing in its request various information about the replaceable ad, and the content-management system 108 could respond to the content-presentation device 104 with a link to obtain a suitable replacement ad from the supplemental content delivery system 112. The content-presentation device 104 could then accordingly use that link to obtain, or to start to obtain, the replacement ad in time to facilitate carrying out the dynamic ad replacement.

Approaching the time when the replaceable ad is scheduled to be present on the channel, the fingerprint-matching server 106 could then further engage in fingerprint matching to detect the actual presence of the scheduled ad on the channel. For instance, based on an ad-ID that the broadcast-schedule specifies for the ad, the fingerprint-matching server 106 could obtain an ad-inventory database as discussed above a set of digital ad fingerprints representing frames of the scheduled ad. And the fingerprint-matching server 106 could compare that ad-fingerprint data with the reference fingerprint data representing frames of the channel. And upon finding a match with sufficient confidence, the fingerprint-matching server 106 could then again signal to the content-presentation device 104 to cause the content-presentation device 104 to proceed with the ad replacement at an ad-start time determined based on the fingerprint matching. The content-presentation device 104 could then proceed accordingly with the ad replacement, substituting in place of the replaceable ad the replacement ad that the content-presentation device 104 has received or is receiving from the supplemental content delivery system 112.

Unfortunately, one technical issue that can occur with this process is that, after the fingerprint-matching server 106 determines from the broadcast-schedule data that a particular replaceable ad is upcoming on the channel being received by the content-presentation device 104 and the fingerprint-matching server 106 informs the content-presentation device 104 of that fact, there is a chance that that particular ad will not actually be present on the channel when scheduled. This could happen, for instance, if a content provider or other entity involved with establishing content of the channel swaps that scheduled ad with another ad without so informing the fingerprint-matching server 106 or other component of the content-modification system 100, so that the other ad would be present at the scheduled time in place of the scheduled ad.

When this happens, the content-presentation device 104 may have already worked with the content-management system 108 to become provisioned with a replacement ad that was deemed to be suitable for replacing the scheduled ad. But because that scheduled ad would not actually be present on the channel when scheduled, the fingerprint-matching server 106 may then detect through its fingerprint matching that that scheduled ad will not be present on the channel when scheduled, and the fingerprint-matching server 106 may therefore signal to the content-presentation device 104 to cause the content-presentation device 104 to abandon the planned dynamic ad replacement.

Yet abandoning a planned dynamic ad replacement could be a commercial loss for an ad-replacement provider and could also amount to a waste of processing resources at the content-presentation device 104 and other components of the content-modification system 100.

The present disclosure provides a mechanism to help address this issue. The disclosed mechanism can be usefully applied to help facilitate dynamic ad replacement and will therefore be described mainly in that context. But the mechanism could also apply as well with respect to other forms of dynamic content modification, not necessarily limited to replacement and not necessarily limited to ads.

In accordance with the disclosure, when a computing system prepares a content-presentation device to dynamically replace a replaceable ad that is scheduled to be present at an upcoming time on a channel being received by the content-presentation device, the computing system will responsively provision the content-presentation device with at least a primary replacement ad and a backup replacement ad. For instance, the computing system could provision the content-presentation device with links to both the primary replacement ad and the backup replacement ad, to enable the content-presentation device to selectively receive either such replacement ad. And/or the computing system could provision the content-presentation device with media files of the primary replacement ad and the backup replacement ad, to enable the content-presentation device to selectively play out either such replacement ad.

Then approaching the time when the replaceable ad is scheduled to be present on the channel, the content-presentation device will make use of a selected one of the primary replacement ad and backup replacement ad, with a selection between those replacement ads being based on whether the scheduled ad will actually be present on the channel when scheduled. For instance, if it turns out that the scheduled ad will be present on the channel when scheduled, then the content-presentation device could replace that ad with the primary replacement ad; whereas, if it is turns out that the scheduled ad will not be present on the channel when scheduled, then the content-presentation device could instead replace the ad with the backup replacement ad.

This process could optimally help to ensure that the content-presentation device still carries out dynamic ad replacement even in a situation where the expected replaceable ad will not be present on the channel when scheduled. Therefore, the process could help overcome the issue noted above.

Note that in this process, the question of whether the replaceable ad will be present on the channel at the time scheduled does not necessarily require precise timing of the presence of the ad. There could be some variance in timing of the ad while still being at the scheduled time. For instance, being present at the scheduled time could encompass being present within 10 seconds or so of the scheduled time, or within another designated tolerance that would still be understood as the ad being present when scheduled. Further, if the fingerprint-matching server 106 is the entity that will detect whether the ad is present on the channel when scheduled, the fingerprint-matching server could take into account the content-transmission delay noted above when evaluating this, perhaps mapping server-side time to client-side time representing when the ad would be present at the content-presentation device 104.

In an example implementation, the computing system that carries out this process could comprise one or more of the components of content-modification system 100 discussed above. Without limitation, for instance, the computing system could comprise one or more of the content-management system 108, the fingerprint-matching server 106, and the content-presentation device 104.

In practice, for instance, when the content-management system 108 receives from the content-presentation device 104 a request for a replacement ad to replace a specified ad that that is scheduled to be upcoming on a channel being received by the content-presentation device 104, the content-management system 108 could responsively determine both primary and backup replacement ads to be provided in response. And the content-management system 108 could then send a response to the content-presentation device 104, specifying both a link to the determined primary replacement ad and a link to the determined backup replacement ad. (Alternatively, in an implementation where the fingerprint-matching server 106 requests the content-management system 108 to designate replacement content, the fingerprint-matching server 106 could receive these two links from the content-management system 108 and could forward the links to the content-presentation device 104.)

When the content-presentation device 104 receives these links, the content-presentation device 104 could then work further to become provisioned with both the primary replacement ad and the backup replacement ad. For instance, the content-presentation device 104 could engage in signaling to download media files of those replacement ads from their respective links, and the content-presentation device 104 could store those media files in local data storage from which the content-presentation device could then play out either such media file when the ad-replacement is to start. Or the content-presentation device 104 could engage in signaling to start receiving streaming media sessions of the replacement ads from their respective links, and the content-presentation device 104 could start buffering each such replacement ad to be prepared to seamlessly start playing out either such replacement ad when the ad-replacement should start.

Furthermore, when the fingerprint-matching 106 detects through fingerprint matching that the scheduled replaceable ad will not actually be present on the channel when scheduled, the fingerprint-matching server 106 may still determine the start time of the ad-replacement opportunity on the channel and inform the content-presentation device 104 of that start time, so that the content-presentation device 104 can still start dynamic ad replacement at that time.

In the situation where the expected replaceable ad is not actually present on the channel at the scheduled time, the fingerprint-matching server 106 may be unable to determine this start time based on the usual fingerprint matching between ad-fingerprint data representing frames of that scheduled ad and reference fingerprint data representing frames of the channel. But the fingerprint-matching server 106 may be able to determine the start time in another manner.

For example, the fingerprint-matching server 106 may use fingerprint matching to detect a series of black video frames or silent frames that represent a pause on the channel before the scheduled ad would have started, and the fingerprint-matching server 106 could deem that time to lead into the start of the ad-replacement opportunity. Further, as another example, accounting for the possibility that the scheduled ad has been swapped with an adjacent ad (e.g., an immediately preceding ad or an immediately following ad according to the schedule), the fingerprint-matching server 106 could use fingerprint matching in an effort to detect whether that adjacent ad is present on the channel at the time when the scheduled ad was scheduled to be present. And if the fingerprint-matching server 106 finds presence of that adjacent ad at that time, then the fingerprint-matching server 106 could deem the start time of that adjacent ad to be the start time of the ad-replacement opportunity.

As yet another example, the fingerprint-matching server 106 may interwork with the above-noted fingerprint-generation engine at the content-distribution system 102 to determine the start time of the ad-replacement opportunity. For instance, as the fingerprint-generation engine is generating reference fingerprints representing frames of the channel at issue, the fingerprint-generation engine could also monitor the channel (e.g., its transport stream) for presence of SCTE messages or watermarking that indicates the start time of an upcoming replaceable ad on the channel. And the fingerprint-generation engine could provide such detected timing information for receipt by the fingerprint-matching server 106, and the fingerprint-matching server could deem that start time to be the relevant start time.

Yet further, as another example, if the broadcast-schedule is accurate enough in terms of timing (even though the scheduled ad may not be present when scheduled), the fingerprint-matching server 106 may deem a start time that the broadcast-schedule indicates for the scheduled replacement ad to be the relevant start time.

Other techniques for determining more specifically the start time of the ad-replacement opportunity, so as to enable the content-presentation device 104 to carry out the dynamic ad replacement at the appropriate time even though an ad other than the scheduled ad is present at that time, could be possible as well.

Upon detecting that the scheduled ad is not present on the channel at the scheduled time, the fingerprint-matching server 106 could thus still signal to the content-presentation device 104 to cause the content-presentation device to carry out dynamic ad replacement at that time.

In this signaling from the fingerprint-matching server 106 to the content-presentation device 104, the fingerprint-matching server 106 could specify that scheduled ad is not going to be present, so that the content-presentation device 104 could then work to determine based on the absence of the scheduled ad whether to present the primary replacement ad or rather the backup replacement ad. Further, in a scenario where the fingerprint-matching server 106 has determined that another particular ad will be present on the channel instead of the scheduled ad (e.g., in the ad-swap scenario described above), the fingerprint-matching server 106 could specify in this signaling an identifier of that other particular ad, which may help facilitate a decision of whether to present the primary replacement ad or rather the backup replacement ad, considering that the scheduled ad would not be present when scheduled.

The content-presentation device 104 could then autonomously select between the primary and backup replacement ads, with the selection being based at least on whether the replaceable ad will be present on the channel when scheduled. For instance, if the replaceable ad will be on the channel when scheduled (e.g., as indicated by signaling from the fingerprint-matching server 106), then, based at least on that fact, the content-presentation device 104 could select the primary replacement ad rather than the backup replacement ad. Whereas, if the replaceable ad will not be on the channel when scheduled (e.g., likewise as indicated by signaling from the fingerprint-matching server 106), then, based at least on that fact, the content-presentation device 104 could select the backup replacement ad rather than the primary replacement ad. And based on that selection, the content-presentation device 104 could then insert output of the selected replacement ad in place of the channel content starting at the designated start time.

Alternatively, the content-presentation device 104 could interwork with the content-management system 108 to select between the primary and backup replacement ads for this purpose. For instance, the content-presentation device 104 could send to the content-management system 108 a query that may indicate that the scheduled replaceable ad will not be present on the channel when scheduled and that seeks to determine which replacement ad should be presented. And in response to this query, the content-management system 108 could select between the primary and backup replacement ads possibly in the same manner as described above with respect to the content-presentation device 104.

Further, in a situation where the content-presentation device 104 knows the identity of the ad that will be present on the channel at the scheduled time (as with the ad-swapping scenario described above, if the fingerprint-matching server 106 determines the identity of the ad that will be present in place of the scheduled ad and informs the content-presentation device 104 of that other ad identity, for instance), the content-presentation device 104 could also inform the content-management system 108 of the identity of that other ad, and the content-management system 108 could use the identity of that other ad as a basis to make the selection between the primary replacement ad and the backup replacement ad. For instance, if one of those two replacement ads is more appropriate than the other replacement ad to replace the other ad that will be present at the scheduled time, then the content-management system 108 may responsively select that more appropriate replacement ad to be the one that the content-presentation device 104 will output in the dynamic ad replacement process.

In these or other example scenarios, the backup replacement ad could be an ad that is more generally applicable than the primary replacement ad, so that the backup replacement ad can reasonably replace whatever ad is present on the channel at the scheduled time whereas the primary replacement ad would be more appropriate specifically to replace the scheduled ad. For instance, the backup replacement ad could be a more broadly targeted ad than the primary replacement ad or may not be targeted at all. Further, the backup replacement ad could be an ad for the same brand of goods or services as the primary replacement ad, and/or could share an advertiser source with the primary replacement ad or otherwise satisfy creative-versioning rules, among other possibilities.

Note also that, while this discussion focuses on the use of primary and backup replacement ads, similar principles could also encompass an implementation with more than two candidate replacement ads. For instance, the content-management system 108 could provision the content-presentation device 104 with three or more candidate replacement ads. Then based on whether or not the scheduled replaceable ad will actually be present when scheduled and perhaps further based on what ad may be present in its place, the content-presentation device 104 and/or content-management system could select one of the multiple provisioned candidate replacement ads to be the one that the content-presentation device will apply. And the content-presentation device 104 could proceed accordingly.

Figure 5:
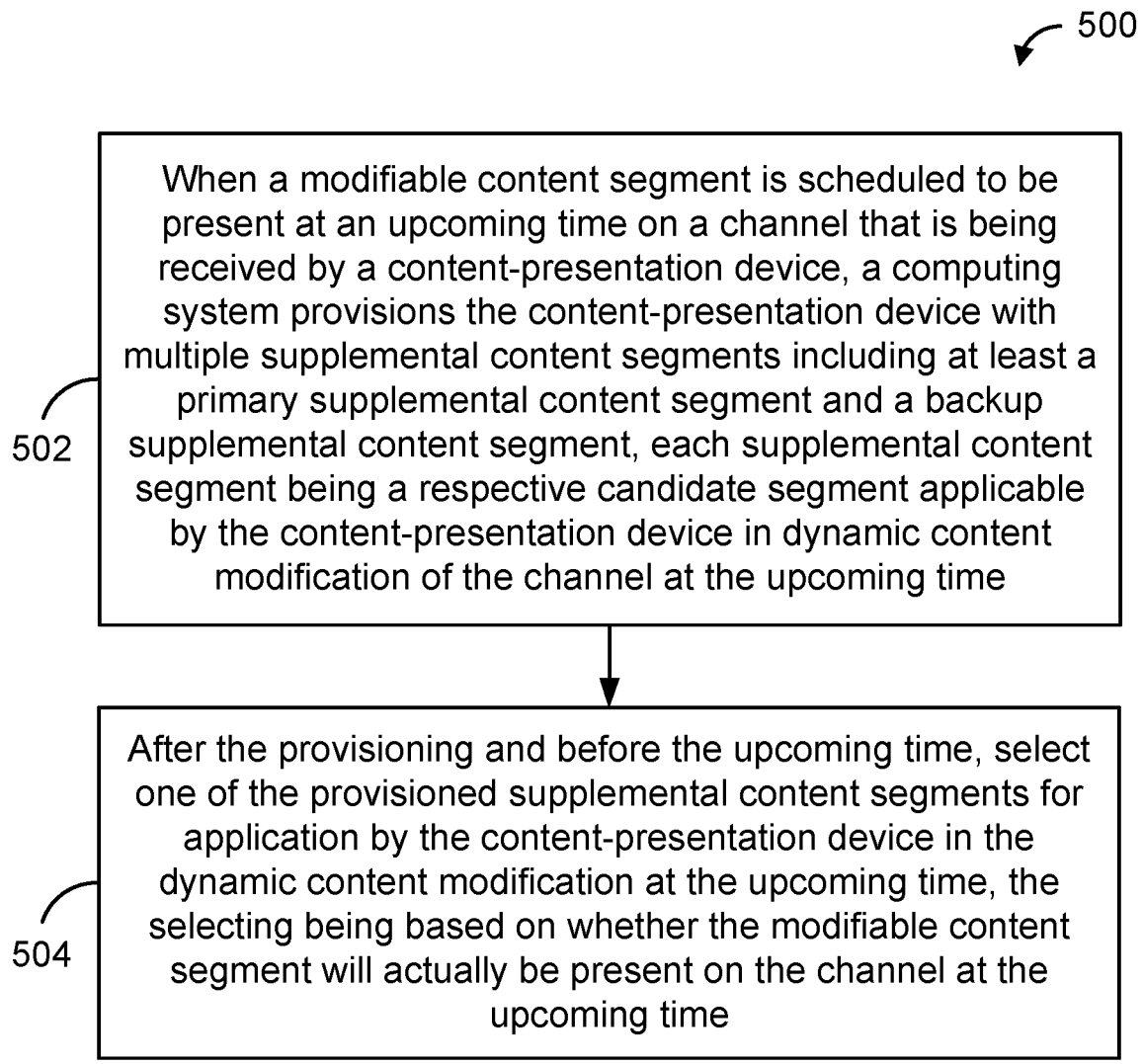
FIG. 5 is a flow chart depicting a method that can be carried out in accordance with the present disclosure.

FIG. 5 is a flow chart depicting a method 500 that can be carried out to help facilitate dynamic content modification.

As discussed above, this method can be implemented by a computing system, which could include one or more entities of the content-modification system 100 noted above.

As shown in FIG. 5, at block 502, the method includes, when a modifiable content segment is scheduled to be present at an upcoming time on a channel that is being received by a content-presentation device, a computing system provisioning the content-presentation device with multiple supplemental content segments including at least a primary supplemental content segment and a backup supplemental content segment, each supplemental content segment being a respective candidate segment applicable by the content-presentation device in dynamic content modification of the channel at the upcoming time. And at block 504, the method includes, after the provisioning and before the upcoming time, selecting one of the provisioned supplemental content segments for application by the content-presentation device in the dynamic content modification at the upcoming time, the selecting being based on whether the modifiable content segment will actually be present on the channel at the upcoming time. Further, the method could then further include controlling or otherwise causing the content-presentation device to apply the selected supplemental content segment in the dynamic content modification at the upcoming time.

In line with the discussion above, in this method, the modifiable content segment could be a replaceable ad, the multiple supplemental content segments could be multiple replacement ads, with the primary supplemental content segment being a primary replacement ad and the backup supplemental content segment being a backup replacement ad, and the dynamic content modification could be dynamic ad replacement. Further, the method could additionally include determining that the replaceable ad is scheduled to be present at the upcoming time on the channel that is being received by a content-presentation device, with the determining being based on broadcast-schedule data.

In addition, as discussed above, the computing system could include a content-management system in network communication with the content-presentation device. And the method could additionally include the content-management system receiving from the content-presentation device a request for at least one replacement ad, the request identifying the replaceable ad that is scheduled to be present on the channel at the upcoming time. And the method could then include, responsive to at least the request, (i) choosing by the content-management system the primary and backup replacement ads as respective candidate replacement ads for the content-presentation device to substitute into the channel at the upcoming time and (ii) provisioning the content-presentation device with at least the chosen primary and backup replacement ads.

As further discussed above, the act of provisioning the content-presentation device with the chosen primary and backup replacement ads could involve sending to the content-presentation device a link to the primary replacement ad and a link to the backup replacement ad, to enable the content-presentation device to obtain, using the links, the primary replacement ad and the backup replacement ad. And provisioning the content-presentation device with the chosen primary and backup replacement ads could further involve the content-presentation device buffering at least a portion of the primary replacement ad and at least a portion of the backup replacement ad, perhaps concurrently separate a respective buffer for each.

In addition, as discussed above, the act of selecting one of the provisioned replacement ads for application by the content-presentation device in the dynamic ad replacement at the upcoming time could involve (i) making a determination of whether the replaceable ad will actually be present at the upcoming time on the channel, (ii) if the determination is that the modifiable content segment will actually be present at the upcoming time on the channel, then selecting the primary replacement ad, rather than the backup replacement ad, for the content-presentation device to substitute into the channel at the upcoming time, and (iii) if the determination is that the modifiable content segment will not actually be present at the upcoming time on the channel, then selecting the backup replacement ad, rather than the primary replacement ad, for the content-presentation device to substitute into the channel at the upcoming time.

Further, as discussed above, the act of determining whether the replaceable ad will actually be present at the upcoming time on the channel could be based on digital fingerprint matching.

And still further, in a situation where the act of determining whether the replaceable ad will actually be present at the upcoming time on the channel involves determining that the replaceable ad will not actually be present at the upcoming time on the channel but that a different replaceable ad will instead be present at the upcoming time on the channel, the selecting one of the provisioned replacement ads for application by the content-presentation device in the dynamic ad replacement at the upcoming time could be further based on an identity of the different replaceable ad. And in an example scenario as noted above, the replaceable ad and the different replaceable ad could be swapped on the channel, resulting in the different replaceable ad being present on the channel when the replaceable ad was scheduled to be present on the channel.

In addition, as discussed above, the act of selecting of one of the provisioned replacement ads for application by the content-presentation device in the dynamic ad replacement at the upcoming time could be done by a content-management system in network communication with the content-presentation device. Or the act of selecting of one of the provisioned replacement ads for application by the content-presentation device in the dynamic ad replacement at the upcoming time could be done by the content-presentation device.

And as further noted above, the backup replacement ad can be more broadly applicable than the primary replacement ad.

IV. Example Variations

Although the examples and features described above have been described in connection with specific entities and specific operations, in practice, there are likely to be many instances of these entities and many instances of these operations being performed, perhaps contemporaneously or simultaneously, on a large-scale basis. Indeed, in practice, the content-modification system 100 is likely to include many content-distribution systems (each potentially transmitting content on many channels) and many content-presentation devices, with some or all of the described operations being performed on a routine and repeating basis in connection with some or all of these entities.

In addition, although some of the operations described in this disclosure have been described as being performed by a particular entity, the operations can be performed by any entity, such as the other entities described in this disclosure. Further, although the operations have been recited in a particular order and/or in connection with example temporal language, the operations need not be performed in the order recited and need not be performed in accordance with any particular temporal restrictions. However, in some instances, it can be desired to perform one or more of the operations in the order recited, in another order, and/or in a manner where at least some of the operations are performed contemporaneously/simultaneously. Likewise, in some instances, it can be desired to perform one or more of the operations in accordance with one more or the recited temporal restrictions or with other timing restrictions. Further, each of the described operations can be performed responsive to performance of one or more of the other described operations. Also, not all of the operations need to be performed to achieve one or more of the benefits provided by the disclosure, and therefore not all of the operations are required.

Although certain variations have been described in connection with one or more examples of this disclosure, these variations can also be applied to some or all of the other examples of this disclosure as well and therefore aspects of this disclosure can be combined and/or arranged in many ways. The examples described in this disclosure were selected at least in part because they help explain the practical application of the various described features.

Also, although select examples of this disclosure have been described, alterations and permutations of these examples will be apparent to those of ordinary skill in the art. Other changes, substitutions, and/or alterations are also possible without departing from the invention in its broader aspects as set forth in the claims.

What is claimed is:

1. A method comprising:
   when a modifiable content segment is scheduled to be present at an upcoming time on a channel that is being received by a content-presentation device, provisioning, by a computing system, the content-presentation device with multiple supplemental content segments including at least a primary supplemental content segment and a backup supplemental content segment, each supplemental content segment being a respective candidate segment applicable by the content-presentation device in dynamic content modification of the channel at the upcoming time; and
   after the provisioning and before the upcoming time, selecting one of the provisioned supplemental content segments for application by the content-presentation device in the dynamic content modification at the upcoming time, the selecting being based on whether the modifiable content segment will actually be present on the channel at the upcoming time.

2. The method of claim 1, wherein the modifiable content segment is a replaceable ad, wherein the multiple supplemental content segments are multiple replacement ads, including the primary supplemental content segment being a primary replacement ad and the backup supplemental content segment being a backup replacement ad, and wherein the dynamic content modification is dynamic ad replacement.

3. The method of claim 2, further comprising determining that the replaceable ad is scheduled to be present at the upcoming time on the channel that is being received by a content-presentation device, wherein the determining is based on broadcast-schedule data.

4. The method of claim 2, wherein the computing system comprises a content-management system in network communication with the content-presentation device.

5. The method of claim 2, wherein selecting one of the provisioned replacement ads for application by the content-presentation device in the dynamic ad replacement at the upcoming time comprises:
   determining whether the replaceable ad will actually be present at the upcoming time on the channel;
   if the determining is that the modifiable content segment will actually be present at the upcoming time on the channel, then selecting the primary replacement ad, rather than the backup replacement ad, for the content-presentation device to substitute into the channel at the upcoming time; and
   if the determining is that the modifiable content segment will not actually be present at the upcoming time on the channel, then selecting the backup replacement ad, rather than the primary replacement ad, for the content-presentation device to substitute into the channel at the upcoming time.

6. The method of claim 2, wherein the computing system comprises a content-management system in network communication with the content-presentation device, and wherein the selecting of one of the provisioned replacement ads for application by the content-presentation device in the dynamic ad replacement at the upcoming time is done by the content-management system.

7. The method of claim 2, wherein the selecting of one of the provisioned replacement ads for application by the content-presentation device in the dynamic ad replacement at the upcoming time is done by the content-presentation device.

8. The method of claim 2, wherein the backup replacement ad is more broadly applicable than the primary replacement ad.

9. The method of claim 4, further comprising:
   receiving by the content-management system from the content-presentation device a request for at least one replacement ad, the request identifying the replaceable ad that is scheduled to be present on the channel at the upcoming time; and
   responsive to at least the request, (i) choosing by the content-management system the primary and backup replacement ads as respective candidate replacement ads for the content-presentation device to substitute into the channel at the upcoming time and (ii) provisioning the content-presentation device with at least the chosen primary and backup replacement ads.

10. The method of claim 9, wherein provisioning the content-presentation device with the chosen primary and backup replacement ads comprises sending to the content-presentation device a link to the primary replacement ad and a link to the backup replacement ad, to enable the content-presentation device to obtain, using the links, the primary replacement ad and the backup replacement ad.

11. The method of claim 10, wherein provisioning the content-presentation device with the chosen primary and backup replacement ads further comprises the content-presentation device buffering at least a portion of the primary replacement ad and at least a portion of the backup replacement ad.

12. The method of claim 5, wherein determining whether the replaceable ad will actually be present at the upcoming time on the channel is based on digital fingerprint matching.

13. The method of claim 5, wherein determining whether the replaceable ad will actually be present at the upcoming time on the channel comprises determining that the replaceable ad will not actually be present at the upcoming time on the channel but that a different replaceable ad will instead be present at the upcoming time on the channel,
   wherein selecting one of the provisioned replacement ads for application by the content-presentation device in the dynamic ad replacement at the upcoming time is further based on an identity of the different replaceable ad.

14. The method of claim 13, wherein the replaceable ad and the different replaceable ad are swapped on the channel, resulting in the different replaceable ad being present on the channel when the replaceable ad was scheduled to be present on the channel.

15. At least one non-transitory computer-readable storage medium, having stored thereon program instructions that, upon execution by at least one processor, cause performance of a set of operations comprising:
when a modifiable content segment is scheduled to be present at an upcoming time on a channel that is being received by a content-presentation device, provisioning the content-presentation device with multiple supplemental content segments including at least a primary supplemental content segment and a backup supplemental content segment, each supplemental content segment being a respective candidate segment applicable by the content-presentation device in dynamic content modification of the channel at the upcoming time; and
after the provisioning and before the upcoming time, selecting one of the provisioned supplemental content segments for application by the content-presentation device in the dynamic content modification at the upcoming time, the selecting being based on whether the modifiable content segment will actually be present on the channel at the upcoming time.

16. The at least one non-transitory computer-readable storage medium of claim 15, wherein the modifiable content segment is a replaceable ad, wherein the multiple supplemental content segments are multiple replacement ads, including the primary supplemental content segment being a primary replacement ad and the backup supplemental content segment being a backup replacement ad, and wherein the dynamic content modification is dynamic ad replacement.

17. The at least one non-transitory computer-readable storage medium of claim 16, wherein selecting one of the provisioned replacement ads for application by the content-presentation device in the dynamic ad replacement at the upcoming time comprises:
determining whether the replaceable ad will actually be present at the upcoming time on the channel;
if the determining is that the modifiable content segment will actually be present at the upcoming time on the channel, then selecting the primary replacement ad, rather than the backup replacement ad, for the content-presentation device to substitute into the channel at the upcoming time; and
if the determining is that the modifiable content segment will not actually be present at the upcoming time on the channel, then selecting the backup replacement ad, rather than the primary replacement ad, for the content-presentation device to substitute into the channel at the upcoming time.

18. A computing system comprising:
at least one processor; and
at least one non-transitory computer-readable storage medium, having stored thereon program instructions that, upon execution by the at least one processor, cause performance of a set of operations comprising:
when a modifiable content segment is scheduled to be present at an upcoming time on a channel that is being received by a content-presentation device, provisioning the content-presentation device with multiple supplemental content segments including at least a primary supplemental content segment and a backup supplemental content segment, each supplemental content segment being a respective candidate segment applicable by the content-presentation device in dynamic content modification of the channel at the upcoming time, and
after the provisioning and before the upcoming time, selecting one of the provisioned supplemental content segments for application by the content-presentation device in the dynamic content modification at the upcoming time, the selecting being based on whether the modifiable content segment will actually be present on the channel at the upcoming time.

19. The computing system of claim 18, wherein the modifiable content segment is a replaceable ad, wherein the multiple supplemental content segments are multiple replacement ads, including the primary supplemental content segment being a primary replacement ad and the backup supplemental content segment being a backup replacement ad, and wherein the dynamic content modification is dynamic ad replacement.

20. The computing system of claim 19, wherein selecting one of the provisioned replacement ads for application by the content-presentation device in the dynamic ad replacement at the upcoming time comprises:
determining whether the replaceable ad will actually be present at the upcoming time on the channel;
if the determining is that the modifiable content segment will actually be present at the upcoming time on the channel, then selecting the primary replacement ad, rather than the backup replacement ad, for the content-presentation device to substitute into the channel at the upcoming time; and
if the determining is that the modifiable content segment will not actually be present at the upcoming time on the channel, then selecting the backup replacement ad, rather than the primary replacement ad, for the content-presentation device to substitute into the channel at the upcoming time.

* * * * *